United States Patent
Neugebauer et al.

(10) Patent No.: US 9,245,520 B2
(45) Date of Patent: Jan. 26, 2016

(54) REVERBERATOR AND METHOD FOR REVERBERATING AN AUDIO SIGNAL

(75) Inventors: Bernhard Neugebauer, Erlangen (DE); Jan Plogsties, Erlangen (DE); Juha Vilkamo, Helsinki (FI)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 519 days.

(21) Appl. No.: 13/452,351

(22) Filed: Apr. 20, 2012

(65) Prior Publication Data

US 2012/0263311 A1 Oct. 18, 2012

Related U.S. Application Data

(63) Continuation of application No. PCT/EP2010/064909, filed on Oct. 6, 2010.

(60) Provisional application No. 61/253,655, filed on Oct. 21, 2009.

(51) Int. Cl.
*H03G 3/00* (2006.01)
*G10K 15/12* (2006.01)

(52) U.S. Cl.
CPC ..................................... *G10K 15/12* (2013.01)

(58) Field of Classification Search
CPC ............. G01S 15/8977; G01S 15/897; G01S 7/52026; G01S 13/89; G01S 15/895; G01S 13/103; G01S 15/04; G01S 15/88; G01S 15/89; G01S 15/8913; G01S 15/8929; G01S 15/8938; G01S 15/96; G01S 15/8909; G10K 15/12; H04S 7/305; H04S 3/00; H04S 1/002; G10H 1/0091; H04L 25/03038

USPC ........... 381/63, 92, 61; 333/138; 84/630, 629; 375/232

See application file for complete search history.

(56) References Cited

U.S. PATENT DOCUMENTS

| | | | | | |
|---|---|---|---|---|---|
| 3,417,837 | A | * | 12/1968 | Flanagan | 367/44 |
| 3,992,582 | A | * | 11/1976 | Osakabe | 381/63 |
| 4,375,623 | A | * | 3/1983 | Franssen et al. | 333/138 |
| 4,485,484 | A | * | 11/1984 | Flanagan | 381/92 |
| 4,910,706 | A | * | 3/1990 | Hyatt | 365/45 |

(Continued)

FOREIGN PATENT DOCUMENTS

| | | |
|---|---|---|
| CN | 101136197 | 3/2005 |
| CN | 101034548 | 9/2007 |

(Continued)

OTHER PUBLICATIONS

Breebaart, Herre, Jun, Kjörling, Koppens, Plogsties, Villemoes, "Multi-Channel Goes Mobile: MPEG Surround Binaural Rendering", Sep. 2006, 29 th AES conference.

(Continued)

*Primary Examiner* — Xu Mei
*Assistant Examiner* — Ubachukwu Odunukwe
(74) *Attorney, Agent, or Firm* — Michael A. Glenn; Perkins Coie LLP

(57) ABSTRACT

A reverberator for reverberating an audio signal includes a feedback delay loop processor for delaying at least two different frequency subband signals representing the audio signal by different loop delays to obtain reverberated frequency subband signals.

15 Claims, 18 Drawing Sheets

(REVERBERATOR)

(56) References Cited

U.S. PATENT DOCUMENTS

| | | | |
|---|---|---|---|
| 4,975,927 A * | 12/1990 | Yoshida | 375/235 |
| 5,272,274 A * | 12/1993 | Kimura | 84/658 |
| 5,491,754 A * | 2/1996 | Jot et al. | 381/63 |
| 5,511,129 A * | 4/1996 | Craven et al. | 381/103 |
| 5,610,991 A * | 3/1997 | Janse | 381/92 |
| 5,657,391 A | 8/1997 | Jyosako | |
| 5,815,580 A * | 9/1998 | Craven et al. | 381/58 |
| 6,072,879 A * | 6/2000 | Ouchi et al. | 381/61 |
| 6,317,703 B1 * | 11/2001 | Linsker | 702/190 |
| 6,483,922 B1 * | 11/2002 | Limacher | 381/63 |
| 6,723,910 B1 | 4/2004 | Tsou et al. | |
| 7,330,552 B1 * | 2/2008 | LaMance | 381/18 |
| 8,036,404 B2 * | 10/2011 | Kates | 381/312 |
| 8,351,614 B2 | 1/2013 | Wu et al. | |
| 2001/0024504 A1 * | 9/2001 | Jot et al. | 381/63 |
| 2002/0067836 A1 * | 6/2002 | Paranjpe | 381/63 |
| 2003/0007648 A1 * | 1/2003 | Currell | 381/61 |
| 2005/0180579 A1 * | 8/2005 | Baumgarte et al. | 381/63 |
| 2007/0038439 A1 | 2/2007 | Schuijers et al. | |
| 2008/0069197 A1 * | 3/2008 | Kind et al. | 375/232 |
| 2008/0085008 A1 | 4/2008 | Vickers | |
| 2009/0003614 A1 * | 1/2009 | Neunaber | 381/63 |
| 2009/0220100 A1 * | 9/2009 | Ohta et al. | 381/63 |
| 2011/0173005 A1 * | 7/2011 | Hilpert et al. | 704/500 |
| 2012/0057715 A1 * | 3/2012 | Johnston et al. | 381/63 |
| 2012/0082319 A1 * | 4/2012 | Jot et al. | 381/63 |

FOREIGN PATENT DOCUMENTS

| | | |
|---|---|---|
| EP | 0989543 | 11/2006 |
| JP | S50-039501 | 11/1976 |
| JP | S56125141 A | 10/1981 |
| JP | S58-031600 | 11/1983 |
| JP | S58-205195 | 11/1983 |
| JP | 02256099 A | 10/1990 |
| JP | S56-125141 | 12/1991 |
| JP | 05191894 A | 7/1993 |
| JP | H-05173584 | 7/1993 |
| JP | 05232979 A | 9/1993 |
| JP | 08286691 A | 11/1996 |
| JP | 2000-099061 | 4/2000 |
| JP | 2003-263178 | 9/2003 |
| JP | 2003-271165 | 9/2003 |
| JP | 2003263180 A | 9/2003 |
| JP | 2006-524002 | 4/2004 |
| JP | 2005-308946 | 11/2005 |
| JP | 2008-065232 | 3/2006 |
| WO | WO-86/02791 | 5/1986 |
| WO | WO-2011-057868 | 5/2011 |

OTHER PUBLICATIONS

Karjalainen & Järveläinen, "Reverberation Modeling Using Velvet Noise", 30th AES conference Mar. 2007.

Vickers et al, "Frequency Domain Artificial Reverberation using Spectral Magnitude Decay", 2006, 121th AES convention Oct. 2006.

\* cited by examiner

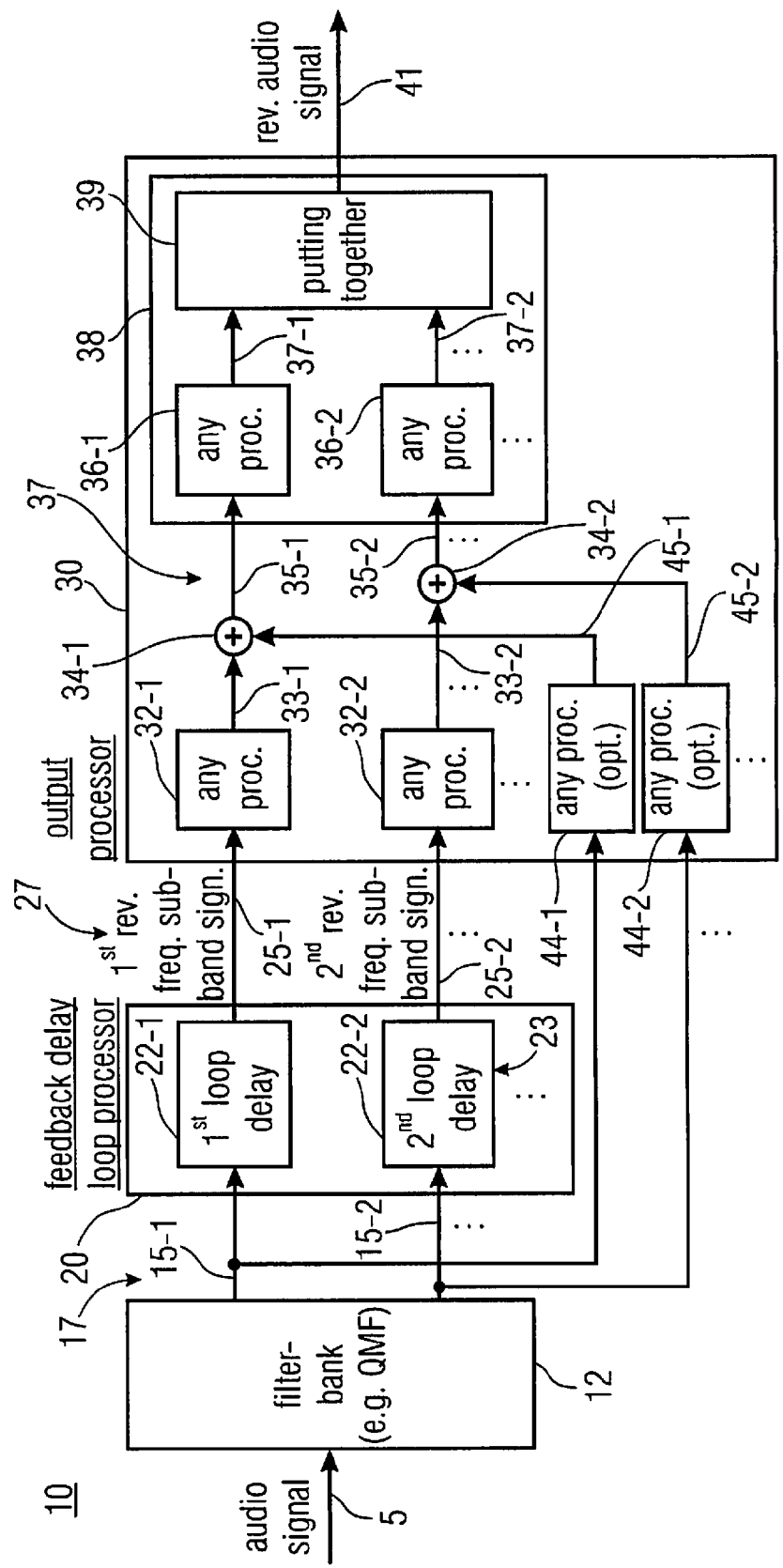
FIG 1A (REVERBERATOR)

(DESIGN OF DIFFERENT LOOP DELAYS)

FIG 1C; D (SINGLE SUBBAND REVERBERATION UNIT)

(EXPONENTIALLY DECAYING NOISE FILTER RESPONSE FUNCTION)

(SPARSE FILTER RESPONSE FUNCTION)

| Phase operation | Output real part | Output imaginary part |
|---|---|---|
| $k \cdot 2\pi$ | Input_real | Input_imag |
| $\pi/2 + k \cdot 2\pi$ | -Input_imag | Input_real |
| $\pi + k \cdot 2\pi$ | -Input_real | -Input_imag |
| $3\pi/2 + k \cdot 2\pi$ | Input_imag | -Input_real |

FIG 10

(TABLE OF MULTIPLICATION-FREE PHASE OPERATIONS)

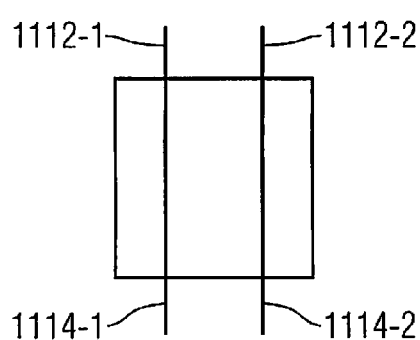
FIG 11A
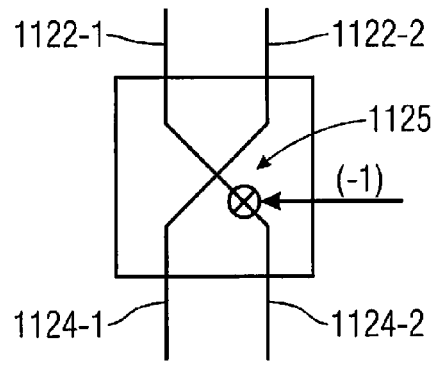
FIG 11B
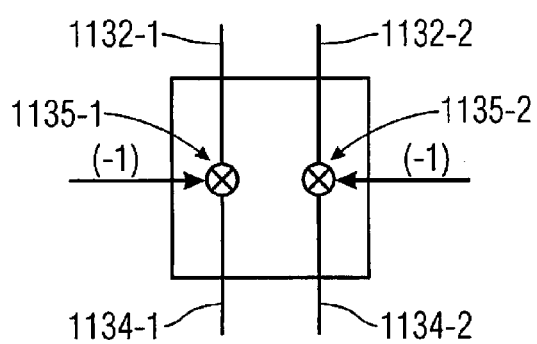
FIG 11C
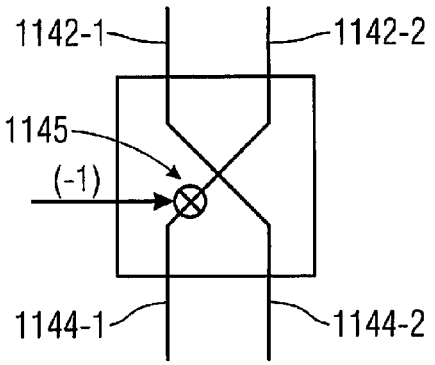
FIG 11D
FIG 11
(DIFFERENT PHASE MODIFICATION UNITS)

(CONCEPTUAL STRUCTURE OF A REVERBERATOR)

(SCHEMATIC ILLUSTRATION OF A CONTINUOUS SHORT-TIME TIME-FREQUENCY TRANSFORM REPRESENTATION)

REVERBERATOR AND METHOD FOR REVERBERATING AN AUDIO SIGNAL

CROSS-REFERENCE TO RELATED APPLICATIONS

This application is a continuation of copending International Application No. PCT/EP2010/064909, filed Oct. 6, 2010, which is incorporated herein by reference in its entirety, and additionally claims priority from U.S. Application No. 61/253,655, filed Oct. 21, 2009, which is incorporated herein by reference in its entirety.

BACKGROUND OF THE INVENTION

Embodiments of the present invention relate to a reverberator and a method for reverberating an audio signal. Further embodiments of the present invention relate to an efficient frequency transform domain reverberator with control for arbitrary reverberation times.

Reverberators are used in creating room effect to audio signals. There are numerous audio signal processing applications where there is a need to add room effect to the signal, namely early reflections and reverberation. Of these two, the early reflections appear for only a very short time period after the signal itself, and can thus be modelled more easily, while the reverberation spans over a long time interval and is often audible up to several seconds after the offset of the dry source sound. The long time span brings the design of the reverberator into the main focus in systems which necessitate a room effect while necessitating low to medium computational cost.

The design goal of the reverberator may be to maximize the perceptual similarity to a certain real or virtual space, or to create reverberation that maximizes some other perceptual property to maximize the listener preference. There exist several algorithms for reverberation, especially for time domain signals, and the design goal almost is to find a balance where the desired quality is maximally reached while the computational load is minimized.

Historically, the reverb design has almost entirely focused on time domain signals. However, in modern audio processing schemes it is very common to have the processing in a short time frequency transform domain, such as in the QMF (quadrature mirror filterbank) domain used in MPEG surround and related technologies, MDCT (modified discrete cosine transform) domain, used in perceptual audio codecs and STFT (short time Fourier transform) domain which is used in a very wide range of applications. While the methods have differences, the common factor is that the time domain signal is divided into time-frequency tiles, such as illustrated in FIG. 16. The transform and the inverse transform operation is typically lossless, and the information about the sound content is thus fully contained in both representations. The time-frequency representation is used especially in perceptual processing of audio since it has closer resemblance to the way human hearing system processes the sound.

According to the state-of-the-art, there are several existing solutions in creating reverberation. In "Frequency Domain Artificial Reverberation using Spectral Magnitude Decay", Vickers et al, 2006, 121th AES convention October 2006 and in US 2008/0085008 A1, a known reverb algorithm functioning in frequency domain is described. Also, "Improvements of Artificial Reverberation by Use of Subband Feedback Delay Networks", Igor Nicolic, 112nd AES convention, 2002, proposes creating reverberation in frequency bands.

An infinitely repeating while decaying impulse response of a reverb can be found in "Artificial Reverberation Based on a Pseudo-Random Impulse Response" parts I and II, Rubak & Johansen, 104th AES convention 1998 and 106th AES convention 1999 and "Reverberation Modeling Using Velvet Noise", Karjalainen & Järveläinen, 30th AES conference March 2007. However, the just-mentioned references are about time-domain reverb algorithms.

In "The Switch Convolution Reverberator", Lee et al, 127th AES Convention October 2009, an artificial reverberator having low memory and small computation costs, appropriate for mobile devices, is presented. The reverberator consists of an equalized comb filter driving a convolution with a short noise sequence. The reverberator equalization and decay rate are controlled by low-order IIR filters, and the echo density is that of the noise sequence, wherein the noise sequence is regularly updated or "switched". Moreover, several structures for updating the noise sequence, including a leaky integrator sensitive to a signal crest factor, and a multi-band architecture, are described.

An underlying problem of the existing solutions is that the current most advanced efficient reverberation algorithms function in the time domain. However, many applications, which work in the frequency domain, necessitate a reverberation unit. Thus, in order to apply these time domain algorithms to a signal, the application will have to first inverse transform the signal before applying the reverberation algorithm in the time domain. This, however, may be impractical depending on the application.

Another disadvantage of known time domain reverberators is that they can be inflexible in terms of designing the reverb to fit a certain set of frequency dependent reverberation times, which is especially important for human spatial perception.

SUMMARY

According to an embodiment, a reverberator for reverberating an audio signal may have: a feedback delay loop processor for delaying at least two different frequency subband signals representing the audio signal by different loop delays to obtain reverberated frequency subband signals, characterized in that the feedback delay loop processor includes for each frequency subband signal of the at least two frequency subband signals a delay line having a plurality of delay line taps providing signals delayed by different tap delays, a feedback loop connected to the delay line and a combiner for combining signals output by the plurality of delay line taps.

According to another embodiment, a method for reverberating an audio signal may have the steps of: delaying at least two different frequency subband signals representing the audio signal by different loop delays by using a feedback delay loop processor to obtain reverberated frequency subband signals, characterized in that the feedback delay loop processor includes for each frequency subband signal of the at least two frequency subband signals a delay line having a plurality of delay line taps providing signals delayed by different tap delays, a feedback loop connected to the delay line and a combiner for combining signals output by the plurality of delay line taps.

Another embodiment may have a computer program having a program code for performing the inventive method when the computer program is executed on a computer.

According to an embodiment of the present invention, a reverberator for reverberating an audio signal comprises a feedback delay loop processor. The feedback delay loop processor is configured for delaying at least two different frequency subband signals representing the audio signal by different loop delays to obtain reverberated frequency subband signals.

In embodiments, the frequency-domain signal representation can be in a real or complex domain. Therefore, all operations performed within the reverberator (e.g. delay, sum or multiplication) can be real or complex operations.

The basic idea underlying the present invention is that the above-mentioned improved quality/efficient implementation can be achieved when at least two different frequency subband signals representing the audio signal are delayed by different loop delays. By such a measure, a perceived repetitiveness of the feedback processing can be avoided or at least reduced, thereby allowing to better maintain the perceived quality.

According to a further embodiment of the present invention, the feedback delay loop processor comprises, for each frequency subband signal, a filter having a filter impulse response, wherein the filter impulse response comprises a first block of filter impulse response samples and a second block of filter impulse response samples. Here, the second block may be similar to the first block with regard to impulse response sample spacing. In addition, the first impulse response sample of the second block may be delayed from the first impulse response sample of the first block by the loop delay for the frequency subband signal. In this way, the first blocks and the second blocks of the filter impulse responses of the filters for the frequency subband signals will be delayed by the different loop delays.

According to a further embodiment of the present invention, the feedback delay loop processor comprises, for each frequency subband signal, a sparse filter having a variable filter tap density. By appropriately varying the filter tap density, the filter impulse response of the sparse filter will approximate a predetermined energy envelope. Therefore, it is possible to control the energy envelopes of the impulse responses of the sparse filters in a frequency dependent way.

According to a further embodiment of the present invention, the feedback delay loop processor is configured to attenuate each frequency subband signal of the at least two frequency subband signals by an attenuation factor. Here, the attenuation factor may depend on a predetermined reverberation time and the loop delay for the frequency subband signal. This allows to subband-wise adjust a gain of the feedback delay loop processing such that an energy decay according to a desired reverberation time can be achieved.

The present invention provides a reverberation structure with an improved efficiency and thus low cost implementation on low-power processors.

BRIEF DESCRIPTION OF THE DRAWINGS

Embodiments of the present invention will be detailed subsequently referring to the appended drawings, in which:

FIG. 1a shows a block diagram of an embodiment of a reverberator for reverberating an audio signal;

FIG. 2b shows a schematic illustration of an impulse response of the embodiment of the single subband reverberation unit in accordance with FIG. 2a;

FIG. 10 shows a table of exemplary multiplication-free phase operations employed by the embodiment of the single subband reverberation unit in accordance with FIG. 9;

FIG. 11a shows a block diagram of a phase modification unit according to an embodiment of the present invention;

FIG. 11b shows a block diagram of a phase modification unit according to a further embodiment of the present invention;

FIG. 11c shows a block diagram of a phase modification unit according to a further embodiment of the present invention;

FIG. 11d shows a block diagram of a phase modification unit according to a further embodiment of the present invention;

DETAILED DESCRIPTION OF THE INVENTION

Figure 1B:
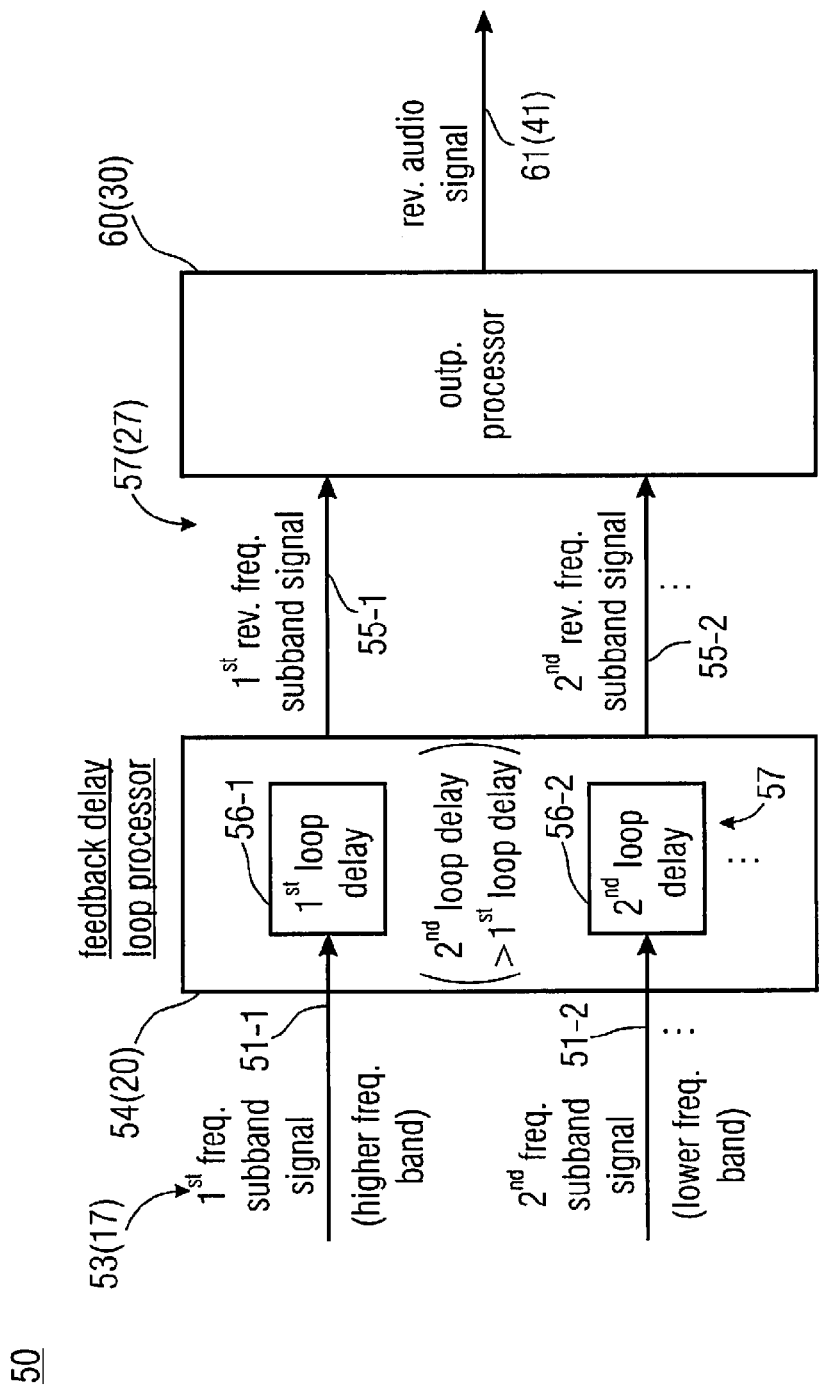
FIG. 1b shows an exemplary design of different loop delays for at least two different frequency subband signals according to an embodiment of the present invention.

FIG. 1a shows a block diagram of an embodiment of a reverberator 10 for reverberating an audio signal. As shown in FIG. 1a, the reverberator 10 comprises a feedback delay loop processor 20 for delaying at least two different frequency subband signals 17 representing the audio signal 5 by different loop delays 23 to obtain reverberated frequency subband signals 27. The reverberator 10 may also comprise an output processor 30 for processing the reverberated frequency subband signals 27 to obtain a reverberated audio signal 41.

Referring to FIG. 1a, the reverberator 10 may further comprise a filterbank 12 such as a QMF (quadrature mirror filterbank) for generating the at least two different frequency subband signals 17 from the original audio signal 5. Moreover, the feedback delay loop processor 20 may comprise a first loop delay unit 22-1 for delaying a first frequency subband signal 15-1 of the at least two different frequency subband signals 17 by a first delay to obtain a first reverberated frequency subband signal 25-1 and a second loop delay unit 22-2 for delaying a second frequency subband signal 15-2 of the at least two different frequency subband signals 17 by a second different delay to obtain a second reverberated frequency subband signal 25-2. The first and the second reverberated frequency subband signals 25-1, 25-2 may constitute the reverberated frequency subband signals 27. In the embodiment of FIG. 1a, the output processor 30 of the reverberator 10 may be configured to mix the at least two frequency subband signals 17 and the corresponding reverberated frequency subband signals 27 to obtain mixed signals 37 and to combine the mixed signals 37 to finally obtain the reverberated audio signal 41. As depicted in FIG. 1a, the output processor 30 may comprise first and second any processing devices 32-1, 32-2 and corresponding adding units 34-1, 34-2. The first any processing device 32-1 may be configured to perform any processing on the first reverberated frequency subband signal 25-1 to obtain a first processed signal 33-1 and the second any processing device 32-2 may be configured to perform any processing on the second reverberated frequency subband signal 25-2 to obtain a second processed signal 33-2. Here, the any processing operations performed by the first and second any processing devices 32-1, 32-2 may, for example, be such that predetermined multiplication or gain factors will be applied to the first and second reverberated frequency subband signals 25-1, 25-2 of the reverberated frequency subband signals 27. The first adding unit 34-1 may be configured to add the first frequency subband signal 15-1 of the at least two different frequency subband signals 17 or a processed version thereof and the first processed signal 33-1 of the any processing device 32-1 to obtain a first added signal 35-1 and the second adding unit 34-2 may be configured to add the second frequency subband signal 15-2 of the at least two different frequency subband signals 17 or a processed version thereof and the second processed signal 33-2 of the any processing device 32-2 to obtain a second added signal 35-2. Here, the first and second added signals 35-1, 35-2 may constitute the at least two mixed signals 37.

As depicted in FIG. 1a, the output processor 30 may further comprise at least two optional any processing devices 44-1, 44-2 for processing the first and second frequency subband signal 15-1, 15-2 of the at least two different frequency subband signals 17. The first optional any processing device 44-1 may be configured to perform any optional processing on the first frequency subband signal 15-1 to obtain a first optionally processed signal 45-1 and to supply the first optionally processed signal 45-1 to the corresponding adding unit 34-1, while the second optional any processing device 44-2 may be configured to perform any optional processing on the second frequency subband signal 15-2 to obtain a second optionally processed signal 45-2 and to supply the second optionally processed signal 45-2 to the corresponding adding unit 34-2. Therefore, the first and second optional any processing devices 44-1, 44-2 can essentially be inserted into the parallel (direct sound) paths between the filterbank 12 and the adding units 34-1, 34-2, respectively, for the first and second frequency subband signal 15-1, 15-2 of the at least two different frequency subband signals 17. For example in binaural processing, the first and second optional any processing devices 44-1, 44-2 can be configured to apply HRTFs (head related transfer functions) to the first and second frequency subband signal 15-1, 15-2 of the at least two different frequency subband signals 17 to obtain the first and second optionally processed signals 45-1, 45-2.

Here, the first adding unit 34-1 may be configured to add the first processed signal 33-1 of the any processing device 32-1 and the first optionally processed signal 45-1 of the optional any processing device 44-1 to obtain the first added signal 35-1, while the second adding unit 34-2 may be configured to add the second processed signal 33-2 of the any processing device 32-2 and the second optionally processed signal 45-2 of the optional any processing device 44-2 to obtain the second added signal 35-2. Here, the first and second added signals 35-1, 35-2 may constitute the at least two mixed signals 37.

It is furthermore shown in FIG. 1a that the output processor 30 may also comprise a combiner 38 for combining the mixed signals 37 to obtain the reverberated audio signal 41. The combiner 38 of the output processor 30 may comprise at least two further any processing devices 36-1, 36-2 and a putting together unit 39. The first further any processing device 36-1 may be configured to further process the first mixed signal 35-1 of the at least two mixed signals 37 to obtain a first further processed signal 37-1 and the second further any processing device 36-2 may be configured to further process the second mixed signal 35-2 of the at least two mixed signals 37 to obtain a second further processed signal 37-2. Similar to the first and second any processing devices 32-1, 32-2, the first and second further any processing devices 36-1, 36-2 may perform the further any processing operations by applying predetermined multiplication or gain factors to the mixed signals 37. The putting together unit 39 of the combiner 38 within the output processor 30 may be configured to subsequently put together or combine the first and second further processed signals 37-1, 37-2 to obtain the reverberated audio signal 41 at the output of the reverberator 10. By a processing such as performed with the reverberator 10, a reverberated audio signal representing combined reverberated frequency subband signals having a combined or larger bandwidth will be obtained. Essentially, the embodiment of FIG. 1a represents a reverberator for reverberating the audio signal within a subband domain such as within a QMF domain.

FIG. 1b shows an exemplary design 50 of different loop delays for the at least two different frequency subband signals according to an embodiment of the present invention. Referring to FIGS. 1a; 1b, the reverberator 10 may comprise a feedback delay loop processor 54 which may be configured so that the loop delay 56-2 for a second frequency subband signal 51-2 of the at least two frequency subband signals 53 representing a lower frequency band will be larger than the loop delay 56-1 for a first frequency subband signal 51-1 of the at least two frequency subband signals 53 representing a higher frequency band. In particular, the feedback delay loop processor 54 may comprise at least two loop delay units 57, wherein a first loop delay unit may be configured to delay the first frequency subband signal 51-1 representing the higher frequency band by the first loop delay 56-1 to obtain a first reverberated frequency subband signal 55-1 and a second loop delay unit may be configured to delay the second frequency subband signal 51-2 representing the lower frequency band by the second larger loop delay 56-2 to obtain a second reverberated frequency subband signal 55-2. The first and second reverberated frequency subband signals 55-1, 55-2 may constitute the reverberated frequency subband signals 57. Here, the feedback delay loop processor 54, the frequency subband signals 53 and the reverberated frequency subband signals 57 of FIG. 1b may correspond to the feedback delay loop processor 20, the at least two different frequency subband signals 17 and the reverberated frequency subband signals 27 of FIG. 1a, respectively. In the design of FIG. 1b, the reverberator 10 may comprise an output processor 60, which may be configured to process the reverberated frequency subband signals 57 to obtain a reverberated audio signal 61. Here, the output processor 60 shown in FIG. 1b may correspond to the output processor 30 shown in FIG. 1a, while the reverberated audio signal 61 output by the output processor 60 may correspond to the reverberated audio signal 41 output by the output processor 30 of FIG. 1a. Therefore, by the design of the different loop delays according to FIG. 1b, the loop delays for successive frequency subband signals of the at least two frequency subband signals representing increasing frequency bands can be made decreasing on average such that an improved perceptual quality of a reverberation will be obtained.

In embodiments, the loop delays for the successive frequency subband signals may, for example, be linearly decreasing or set randomly. By setting different loop delays for the at least two different frequency subband signals, repetition effects of the reverberation can efficiently be avoided or at least reduced.

Figure 1C:
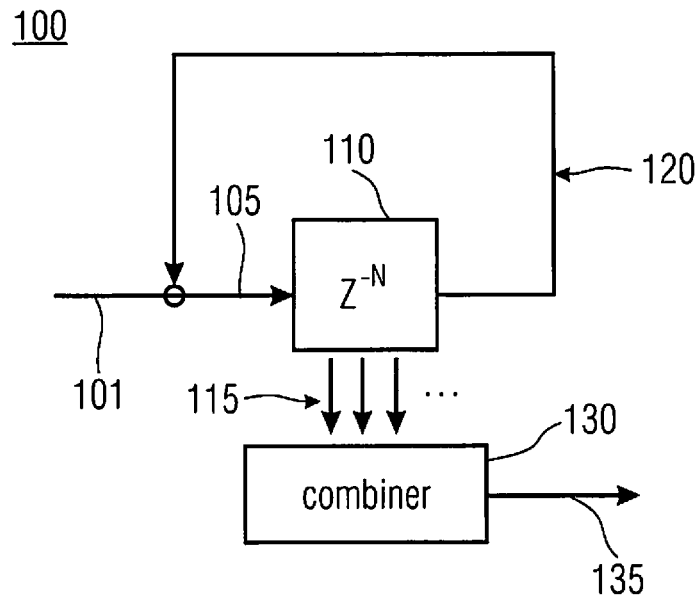
FIG. 1c shows a block diagram of an embodiment of a single subband reverberation unit for processing an individual frequency subband signal.

FIG. 1c shows a block diagram of an embodiment of a single subband reverberation unit 100 for processing an individual frequency subband signal. The single subband reverberation unit 100 comprises a delay line 110, a feedback loop 120 and a combiner 130. As shown in FIG. 1c, the delay line 110 has a plurality 115 of delay line outputs or delay line taps representing different delays. The delay line 110 is configured for providing a delay amount (N). Here, the delay line 110, which is denoted by $z^{-N}$, has a delay line input 105 for the individual frequency subband signal 101. The feedback loop 120 is connected to the delay line 110 and is configured for processing the individual frequency subband signal 101 or a delayed version and for feeding the processed signal or the individual frequency subband signal 101 or a delayed version of the individual frequency subband signal into the delay line input 105. The feedback loop 120 together with the delay line 110 essentially represents a feedback delay loop introducing a respective delay amount N to a signal for each roundtrip of the signal circulating within the feedback loop 120. The combiner 130 is configured for combining signals output by the plurality 115 of delay line outputs or delay line taps to obtain a reverberated frequency subband signal 135. In particular, the combiner 130 may be used to add the signals output by the plurality 115 of delay line outputs together or to first multiply the signals with gain and/or attenuation factors and then add them together or to linearly combine selected signals output by the plurality 115 of delay line outputs. The single subband reverberation unit 100 of the FIG. 1c embodiment allows to generate a reverberated frequency subband signal 135 that has a reverberation corresponding to a reverberation time larger than the delay amount N.

Figure 1D:
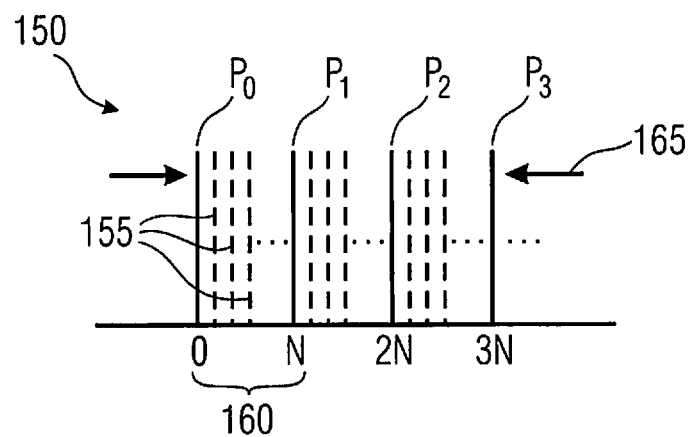
FIG. 1d shows a schematic illustration of an impulse response of the embodiment of the single subband reverberation unit in accordance with FIG. 1c.

FIG. 1d shows a schematic illustration of an impulse response 150 of the embodiment of the single subband reverberation unit 100 in accordance with FIG. 1c. As shown in FIG. 1d, the impulse response 150 comprises a sequence ($P_0$, $P_1$, $P_2$, $P_3$, ...) of equally spaced pulses separated by the delay amount N. The equally spaced pulses ($P_0$, $P_1$, $P_2$, $P_3$, ...) define a repeating interval 160 corresponding to the delay amount N. Moreover, delayed pulses 155 output by the plurality 115 of delay line outputs are distributed within the repeating interval 160 of the equally spaced pulses ($P_0$, $P_1$, $P_2$, $P_3$, ...). It can be seen in FIG. 1d that the equally spaced pulses ($P_0$, $P_1$, $P_2$, $P_3$, ...) of the impulse response 150 of the single subband reverberation unit 100 have a same amplitude, respectively. Referring to FIGS. 1c; 1d, the reverberation of the reverberated frequency subband signal 135 may correspond to a time period 165 being larger than the delay amount N.

Figure 2A:
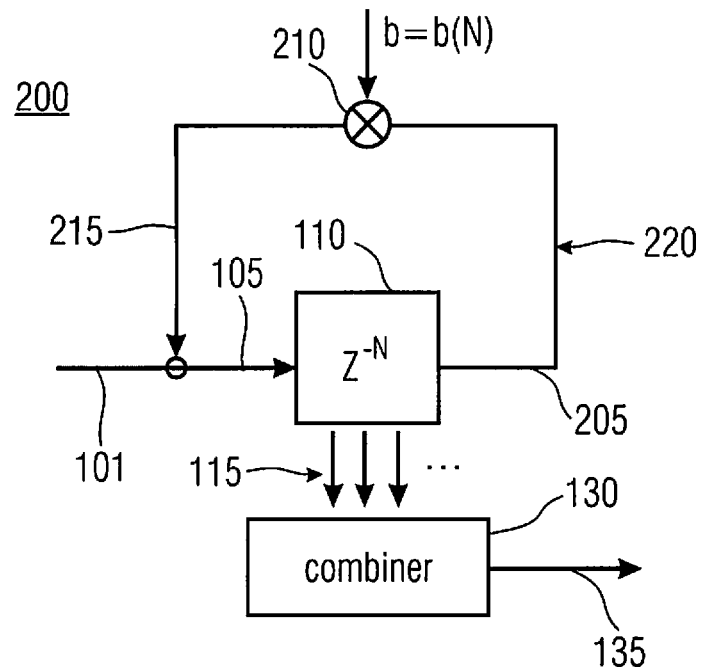
FIG. 2a shows a block diagram of a further embodiment of a single subband reverberation unit with an attenuator within a feedback loop.

FIG. 2a shows a block diagram of a further embodiment of a single subband reverberation unit 200 with an attenuator 210 within a feedback loop. The device 200 of FIG. 2a essentially comprises the same blocks as the apparatus 100 of FIG. 1c. Therefore, identical blocks having similar implementations and/or functions are denoted by the same numerals. However, the feedback loop 220 of the single subband reverberation unit 200 in the FIG. 2a embodiment comprises an attenuator 210 for attenuating a delayed signal 205. Here, the delayed signal 205 is received from the delay line 110 providing a delay amount N for each feeding of an attenuated signal 215 or the frequency subband signal 101 into the delay line input 105. As shown in FIG. 2a, the attenuator 210 is configured to apply an attenuation factor b to the delayed signal 205, wherein the attenuation factor b depends on the provided delay amount N and reverberation time $T_{60}$. As a result of the attenuation by the attenuator 210 within the feedback loop 220, an impulse response of the feedback loop 220 is characterized by a sequence of equally spaced decaying pulses ($P_0$, $P_1$, $P_2$, $P_3$, ...), wherein the repeating interval 160 of the equally spaced decaying pulses ($P_0$, $P_1$, $P_2$, $P_3$, ...) is again defined by the delay amount N.

Figure 2B:
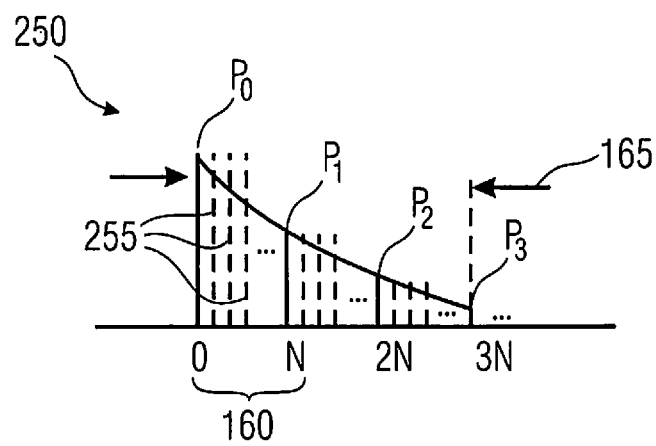

FIG. 2b shows a schematic illustration of an impulse response 250 of the embodiment of the single subband reverberation unit 200 in accordance with FIG. 2a. Referring to the FIG. 2a embodiment, a reverberation of the reverberated frequency subband signal 135 may correspond to an impulse response 250 comprising the sequence of equally spaced decaying pulses ($P_0$, $P_1$, $P_2$, $P_3$, ...), wherein delayed pulses 255 output by the plurality 115 of delay line outputs are distributed within the repeating interval 160 of the equally spaced decaying pulses ($P_0$, $P_1$, $P_2$, $P_3$, ...).

Figure 3:
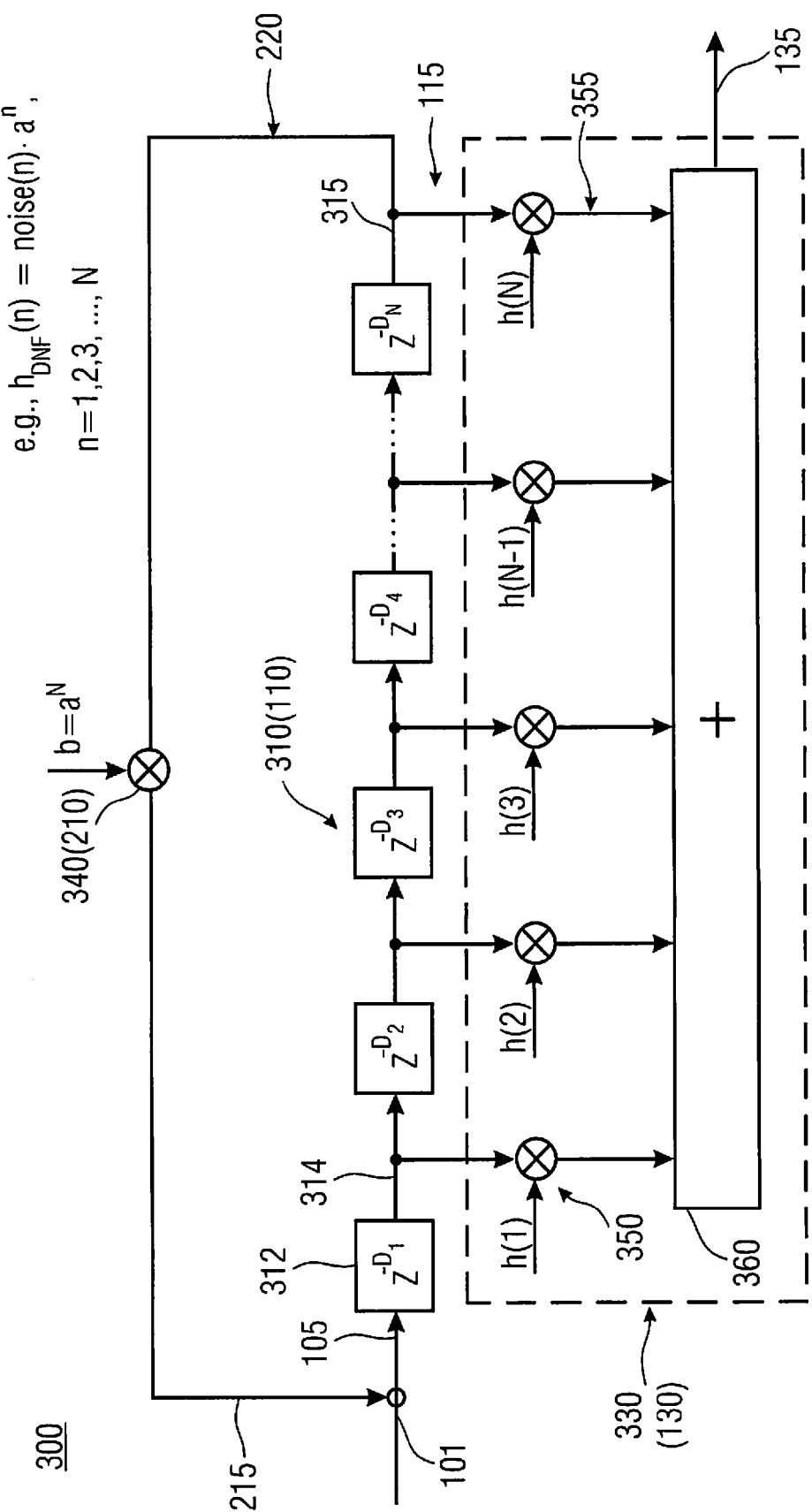
FIG. 3 shows a block diagram of a further embodiment of a single subband reverberation unit with an exponentially decaying noise filter.

FIG. 3 shows a block diagram of a further embodiment of a single subband reverberation unit 300 with an exponentially decaying noise filter. The single subband reverberation unit 300 of the FIG. 3 embodiment essentially corresponds to the single subband reverberation unit 200 of the FIG. 2a embodiment. As depicted in FIG. 3, the delay line 310, which may correspond to the delay line 110 of FIGS. 1c, 2a, comprises a plurality of serially connected delay line units ($z^{-D_1}$, $z^{-D_2}$, ..., $z^{-D_N}$) for successively delaying the attenuated signal 215 or the frequency subband signal 101 fed into the delay line input 105, respectively. Here, each delay line unit 312 of the delay line 310 has a respective delay line output 314 for a successively delayed signal. The combiner 330 of the single subband reverberation unit 300, which may correspond to the combiner 130 of the single subband reverberation unit 100; 200, comprises a plurality 350 of multipliers each connected to a corresponding delay line output. In particular, the plurality 350 of multipliers is configured for multiplying each successively delayed signal output by the plurality 115 of delay line outputs with a corresponding filter coefficient of a filter response function h(n), n=1, 2, ..., N, respectively, to obtain multiplier output signals 355.

In embodiments, an individual delay line unit (individual elementary delay slot) can be denoted by $z^{-D_i}$, wherein $D_i$ (i=1, N) is a partial delay amount, which is introduced by the individual delay line unit. In particular, $D_1, D_2, ..., D_N$ can be the same) ($z^{-D}$) such as 1 ($z^{-1}$) or can have different values. This generalization also refers to the other Figures though not explicitly marked. Here, the partial delay amount $D_i$ may correspond to a delay by one sample (time slot), so that delayed pulses output by the plurality of delay line outputs will be spaced closely adjacent to each other. Specifically, the delay line may comprise a number of individual delay line units that corresponds to the delay amount N provided by the delay line consisting of the plurality of serially connected delay line units ($z^{-D_j}$). According to further embodiments, the delay amount N provided by the delay line may also be obtained when the partial delay amount $D_i$ is increased corresponding to a delay by more than one sample, while at the same time, the number of individual delay line units is reduced. In this case, the delayed pulses output by the plurality of delay line outputs will be spaced further apart from each other corresponding to a coarser resolution.

As shown in FIG. 3, the combiner 330 may comprise an adder 360 for adding together the multiplier output signals 355 to obtain the reverberated frequency subband signal 135. According to the embodiment shown in FIG. 3, the combiner 330 may be set so that the filter response function h(n) will have a decaying amplitude characteristics, wherein a length N of the filter response function h(n) is equal to the delay amount N. Moreover, in the FIG. 3 embodiment, the feedback loop 120 of the single subband reverberation unit 300 is configured for receiving a delayed signal, which may correspond to the delayed signal 205 of FIG. 2a, from an, in processing direction, last delay line unit output 315 of the delay line 310. Here, the processing direction is indicated by the pointing direction of the arrows within the feedback loop 120 and the delay line 310.

Figure 4:
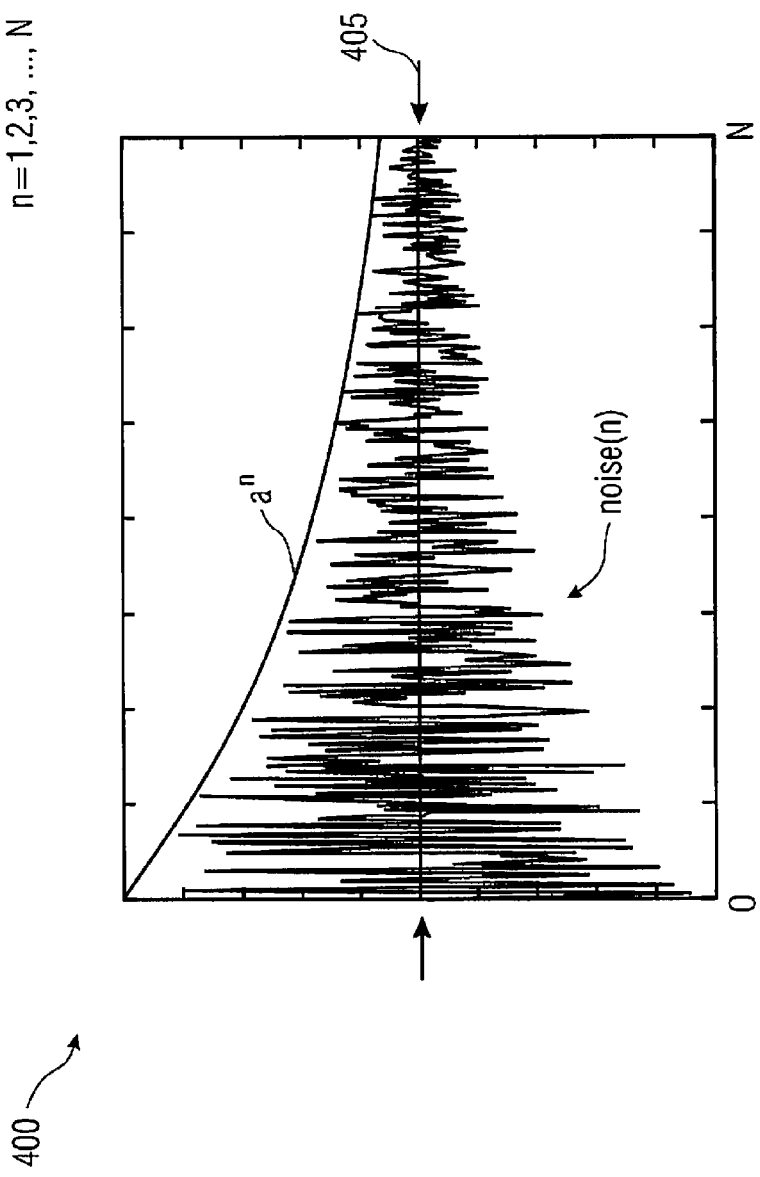
FIG. 4 shows a graph of an exemplary filter response function representing exponentially decaying noise employed by the embodiment of the single subband reverberation unit in accordance with FIG. 3.

FIG. 4 shows a graph of an exemplary filter response function 400 representing exponentially decaying noise employed by the embodiment of the single subband reverberation unit 300 in accordance with FIG. 3. In particular, the combiner 330 of the single subband reverberation unit 300 may be configured to provide a filter response function 400 based on $h_{DNF}(n)=\text{noise}(n)\cdot a^n$, $n=1, 2, \ldots, N$, wherein noise(n) is a noise function, and wherein the decaying amplitude characteristics of the filter response function $h_{DNF}(n)$ is based on an exponentially decaying envelope $a^n$. The noise function noise (n) and the envelope $a^n$ of the exemplary filter response function $h_{DNF}(n)$ 400 are clearly visible in FIG. 4. Moreover, the filter response function $h_{DNF}(n)$ 400 is exemplarily shown in a range between 0 and N, wherein this range corresponds to a length 405 of the filter response function $h_{DNF}(n)$, which may be approximately equal to the delay amount N provided by the delay line 310 as shown in FIG. 3. Specifically, the combiner 330 of the single subband reverberation unit 300 may be set so that the envelope $a^n$ depends on an attenuation a per time slot, wherein the attenuation a per time slot is based on a predefined parameter $T_{60}$ corresponding to the reverberation time. By such a measure, the filter response function $h_{DNF}(n)$ may be adjusted so as to represent a corresponding exponentially decaying energy curve.

The single subband reverberation unit 300 shown in FIG. 3 may also comprise an attenuator 340, which may correspond to the attenuator 210 shown in FIG. 2a, placed within the feedback loop 120. The attenuator 340 of the single subband reverberation unit 300 can be used for attenuating the delayed signal received from the last delay line unit output 315 by applying an attenuation factor to the delayed signal for each roundtrip of the signal within the feedback loop 120. In particular, the attenuator 340 of the single subband reverberation unit 300 is configured to apply an attenuation factor being equal to $b=a^N$ to the delayed signal, wherein a is an attenuation per time slot and N the delay amount. Here, the attenuation for each roundtrip of the feedback loop 120 is performed by multiplying the delayed signal from the last delay line output 315 with the attenuation factor $b=a^N$.

Figure 5:
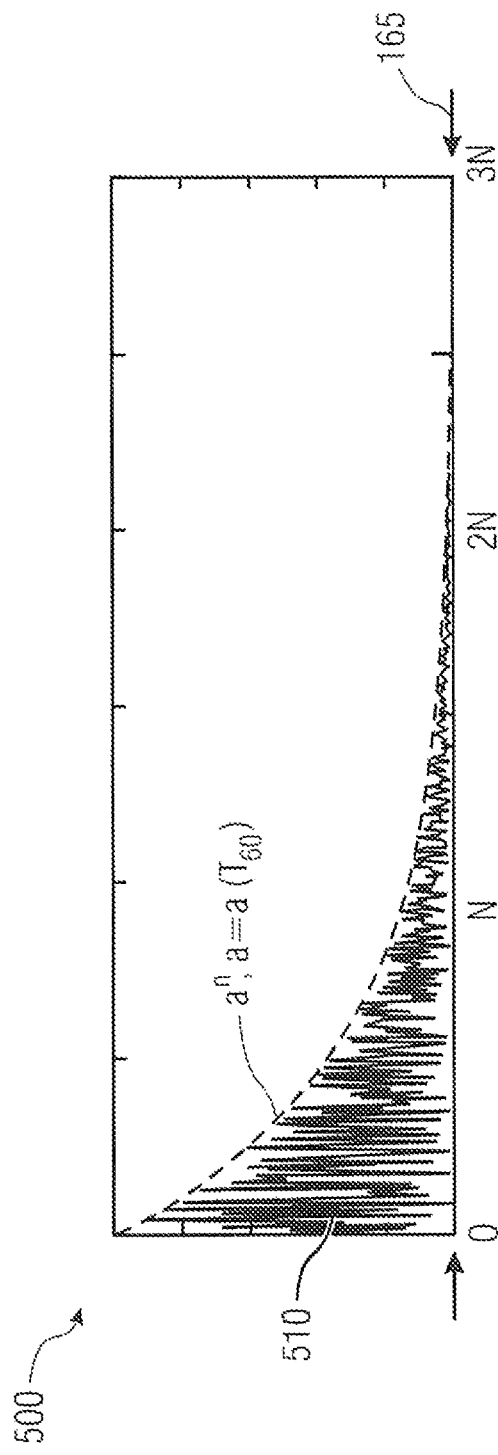
FIG. 5 shows a graph of an exemplary impulse response of the embodiment of the single subband reverberation unit in accordance with FIG. 3.

FIG. 5 shows a graph of an exemplary impulse response 500 of the embodiment of the single subband reverberation unit 300 in accordance with FIG. 3. As shown in FIG. 5, the impulse response 500 of the single subband reverberation unit 300 is characterized by exponentially decaying noise 510 with an envelope function $a^n$, wherein the attenuation a per time slot may be set according to the predefined parameter $T_{60}$.

Specifically, the attenuation factor in the feedback loop (i.e. the attenuation factor b to be applied by the attenuator within the feedback loop) can be calculated from a desired reverberation time in a particular frequency band with formula $$b=a^N,$$

where b is the resulting attenuation factor in the feedback loop and $$a = 10^{\frac{-3 \cdot P}{T_{60} f_s}},$$

where a is the attenuation per time slot, N is the delay line length (i.e. delay amount provided by the delay line) in a particular frequency band, P is a downsampling factor of a frequency transform, $T_{60}$ is the reverberation time and $f_s$ is the sample rate. This formula essentially gives an attenuation factor which corresponds to the given reverberation time $T_{60}$.

Bandwise exponentially decaying Gaussian noise is generally considered to be a good approximation of real diffuse reverberation. This is exactly what is created as a reverberation filter by modulating Gaussian noise by an envelope that attenuates by a factor a per time slot. Therefore, a reverb FIR (finite impulse response) filter can be designed by a function $$h[n]=\text{white}[n]\cdot a^n,$$

or in a complex domain, for example, by a function $$h[n]=\text{white}[n]\cdot a^n \cdot e^{j2\pi \cdot rand[n]},$$

respectively, where white(n) is a process generating white noise, n is the time slot index and rand (n) is a process which generates random variables from equal distribution from 0 to 1. In particular, the filter response function $h_{DNF}(n)$ shown in FIG. 4, which is employed in the FIG. 3 embodiment, can be generated with this process. FIG. 4 exemplarily shows the real part of such a reverberation filter together with its modulation envelope.

Figure 6:
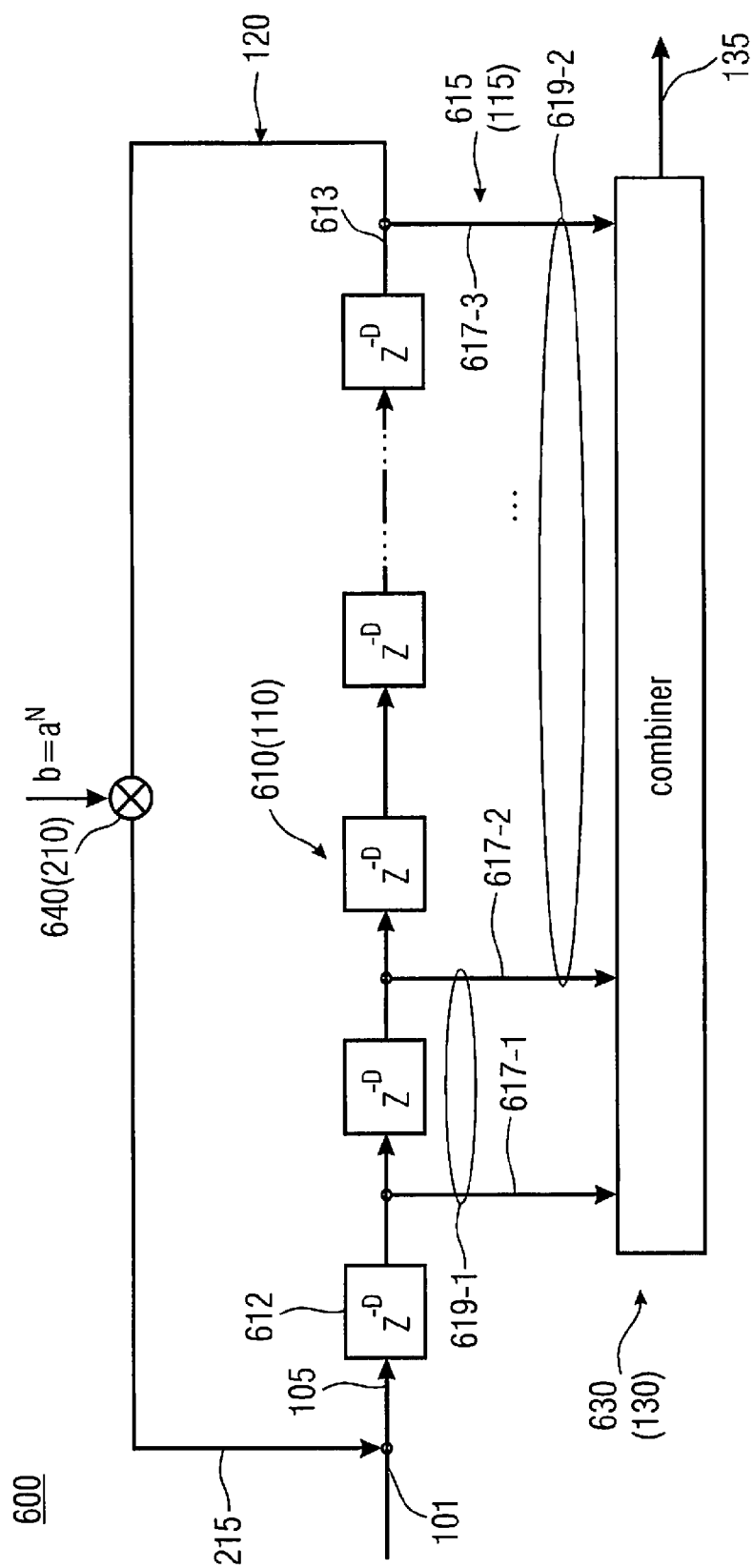
FIG. 6 shows a block diagram of a further embodiment of a single subband reverberation unit with sparse delay line outputs.

FIG. 6 shows a block diagram of a further embodiment of a single subband reverberation unit 600 with sparse delay line outputs. The single subband reverberation unit 600 of FIG. 6 essentially comprises the same blocks as the single subband reverberation unit 200 of FIG. 2a. Therefore, identical blocks having similar implementations and/or functions are denoted by the same numerals. However, the delay line 610 of the single subband reverberation unit 600, which may correspond to the delay line 110 of the single subband reverberation unit 200, comprises a plurality of serially connected delay line units ($z^{-D}$) for successively delaying an attenuated signal 215 or the frequency subband signal 101 fed into the delay line input 105. In the FIG. 6 embodiment, the delay line 610 comprises at least three delay line outputs 615, which may correspond to the plurality of delay line outputs 115 of FIG. 2a, wherein the delay line outputs 615 are configured so that a delay between a first delay line output 617-1 and a second delay line output 617-2 will be different from a delay between the second delay line output 617-2 and a third delay line output 617-3. The feedback loop 120 of the single subband reverberation unit 600 is configured for receiving a delayed signal from an, in processing direction, last delay line unit output 613 of the delay line 610.

Moreover, the feedback loop 120 of the single subband reverberation unit 600 comprises an attenuator 640 for attenuating a delayed signal, wherein the delayed signal is received from the last delay line output 613 of the delay line 610 providing a delay amount N for each feeding of an attenuated signal 215 or the audio signal 101 into the delay line input 105. In particular, the attenuator 640 may be configured to apply an attenuation factor being equal to $b=a^N$ to the delayed signal, wherein a is an attenuation per time slot and N the delay amount. In addition, the plurality 615 of delay line outputs may especially be configured so that a difference between successive delay pairs will on average be increasing. Here, the combiner 630, which may correspond to the combiner 130 of FIG. 1c, is configured to combine the at least three delay line outputs 615 to obtain the reverberated frequency subband signal 135.

In the embodiment of FIG. 6, each individual delay line unit 612 may be configured to introduce a partial delay amount D to a successively delayed signal. Here, the number of the individual delay line units and the partial delay amount D which is introduced to a successively delayed signal may be set as has been described correspondingly before.

According to the FIG. 6 embodiment, delayed pulses output by the at least three delay line outputs 615 will be non-uniformly distributed having a decaying density characteristics within a repeating interval defined by the response of the feedback loop 120. The impulse response of the single subband reverberation unit 600 with sparse delay line outputs essentially corresponds to a sparse filter response function.

Figure 7:
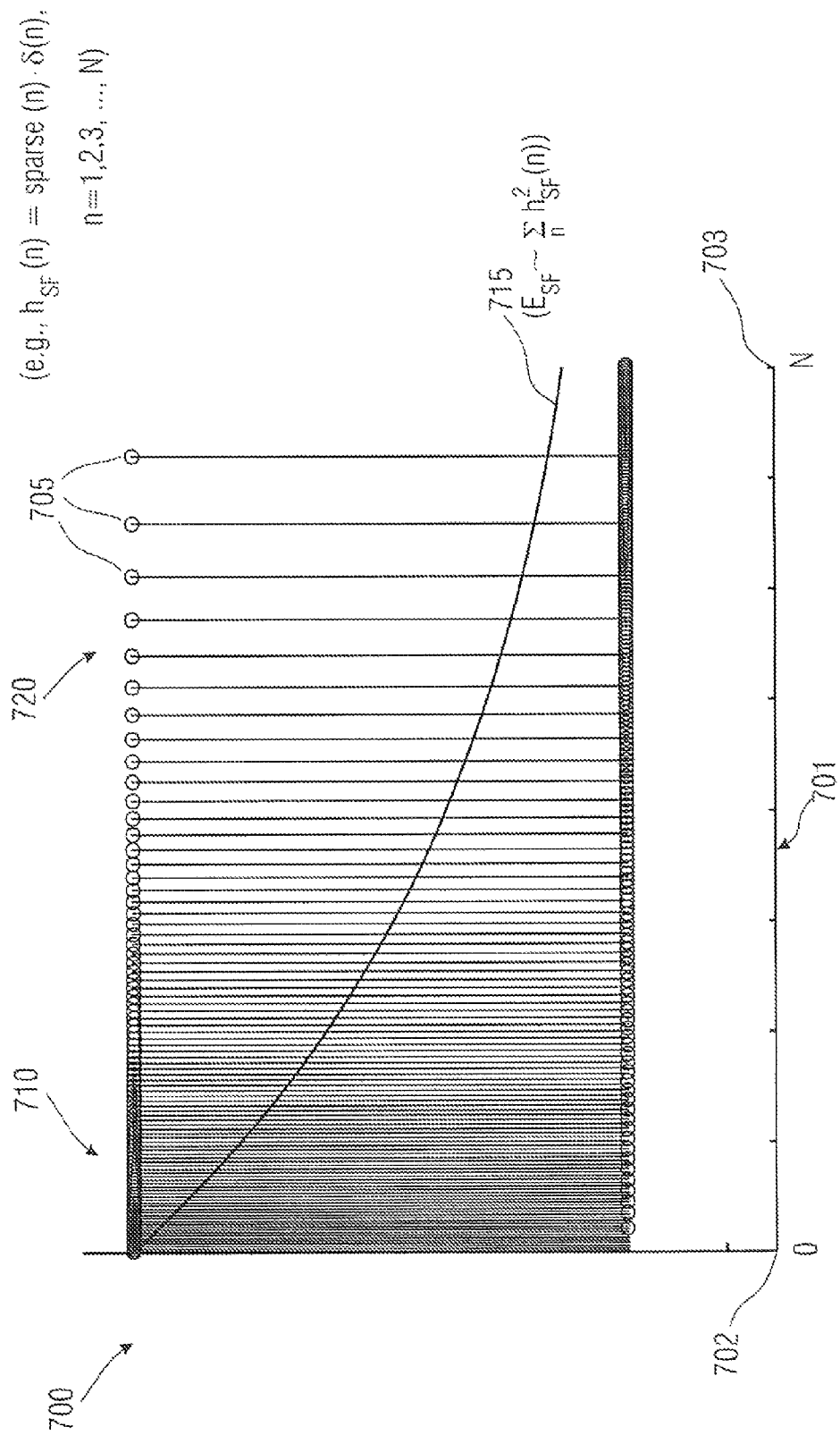
FIG. 7 shows a graph of an exemplary filter response function representing unity impulses with a decaying density employed by the embodiment of the single subband reverberation unit in accordance with FIG. 6.

FIG. 7 shows a graph of an exemplary filter response function 700 representing unity impulses 705 with a decaying density employed by the embodiment of the single subband reverberation unit 600 in accordance with FIG. 6. It can be seen in FIG. 7 that exemplary unity impulses 705 are more densely distributed in a region 710 close to an origin 702 of a time/sample axis 701, while the exemplary unity impulses 705 are becoming more sparsely distributed for larger times/samples 720 up to a border 703 of the frame, wherein the frame is defined by times/samples between 0 and N, wherein time/sample N corresponds to the delay amount N provided by the delay line 610.

For example, the filter response function $h_{SF}(n)$ 700 may be based on $h_{SF}(n)=\text{sparse}(n)$, n=1, 2, ..., N, wherein the plurality 615 of delay line outputs as shown in FIG. 6 may be configured based on a sparse function "sparse(n)", which sparsely distributes the unity impulses 705 with a decreasing density for consecutive time slots. The filter response function $h_{SF}(n)$ 700 may especially be set so as to represent an exponentially decaying energy curve 715. Essentially, FIG. 7 displays sparse tap locations of an FIR filter. The curve 715 depicts a modeled average energy decay ($E_{SF}$). Here, the figure does not include phase modifications.

Figure 8:
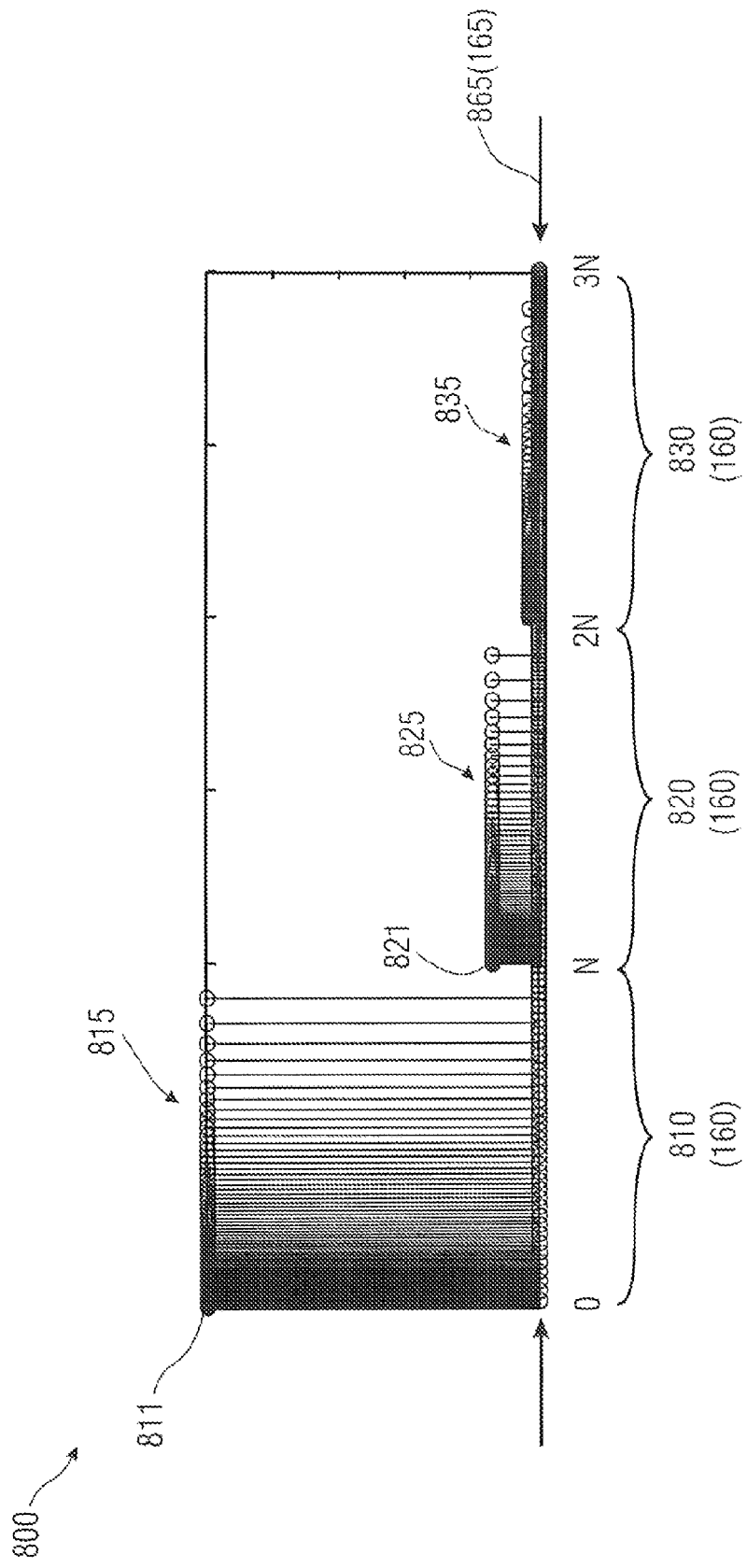
FIG. 8 shows a graph of an exemplary impulse response of the embodiment of the single subband reverberation unit in accordance with FIG. 6.

FIG. 8 shows a graph of an exemplary impulse response 800 of the embodiment of the single subband reverberation unit 600 in accordance with FIG. 6. In FIG. 8, signals (i.e. delayed pulses) output by the plurality 615 of delay line outputs of the single subband reverberation unit 600 are clearly visible. For consecutive feeding of the delay line input 105, the delayed pulses are sparsely or non-uniformly distributed within a first repeating interval 810 between time/sample 0 and N, a second repeating interval 820 between time/sample N and 2N and a third repeating interval 830 between time/sample 2N and 3N. Here, the repeating intervals 810, 820, 830 may correspond to the repeating interval 160 shown in FIGS. 1d; 2b. An overall interval 865 of the impulse response 800 shown in FIG. 8, which may correspond to the time period 165 shown in FIGS. 1d; 2b, corresponds to approximately three times the delay amount N. In particular, the impulse response 800 of the single subband reverberation unit 600 comprises successively delayed sparse pulses having a decaying density for successive time slots within the repeating intervals 810, 820, 830, respectively, wherein the decaying density corresponds to a characteristic distribution of the unity impulses, such as shown in FIG. 7.

It can also be seen in FIG. 8 that amplitudes/levels of the successively delayed sparse pulses 815, 825, 835 within the first, second and third repeating interval 810, 820, 830, respectively, are different from each other and, in particular, are attenuated with respect to each other. Here, the attenuation can be controlled by a respective attenuation factor $b=a^N$ applicable by the attenuator 640 of the single subband reverberation unit 600. In the FIG. 6 embodiment, the attenuation factor $b=a^N$ may, for example, be controlled so that the amplitudes/levels of the successively delayed sparse pulses 815, 825, 835 drop significantly from the first to the second to the third repeating interval 810, 820, 830, respectively.

Referring to FIGS. 6; 8, the decaying densities and the attenuation for the amplitudes/levels of the successively delayed sparse pulses 815, 825 835 can especially be controlled with the delay line 610 and the attenuator 640, so that the impulse response 800 of the single subband reverberation unit 600 (FIG. 8) and the impulse response 500 of the single subband reverberation unit 300 (FIG. 5) will essentially have the same energy decay rate. In particular, the single subband reverberation unit 600 can be realized with much less computational effort as compared to the single subband reverberation unit 300.

This is because although the reverberation algorithm provided by the single subband reverberation unit 300 is conceptually relatively simple, it has overhead in terms of the computational costs. Therefore, a computationally efficient FIR structure such as provided within the single subband reverberation unit 600 is advantageous. The FIG. 6 embodiment is particularly based on the argument that the human hearing is insensitive to the fine structure of a decaying diffuse reverb, but sensitive to the energy decay rate. For this reason, one may replace the decaying amplitude $a^n$ of the impulse response 400 in FIG. 4 with unity impulses with decaying density such as in the impulse response 700 of FIG. 7 to produce the same average overall energy decay.

The visual difference of the overall responses 500; 800 of a single frequency band obtained with the single subband reverberation unit 300 and the single subband reverberation unit 600, respectively, can be clearly seen in FIGS. 5; 8. In particular, in FIGS. 5; 8, absolute values of the response of a reverb algorithm in one frequency band performed with the single subband reverberation units 300; 600 are shown, wherein the short and longterm average energy decay is the same in both responses. Here, phase modifications are not included in the figures. Both responses 500; 800 repeat in intervals of N samples, although the effect is more visible in FIG. 8.

Figure 9:
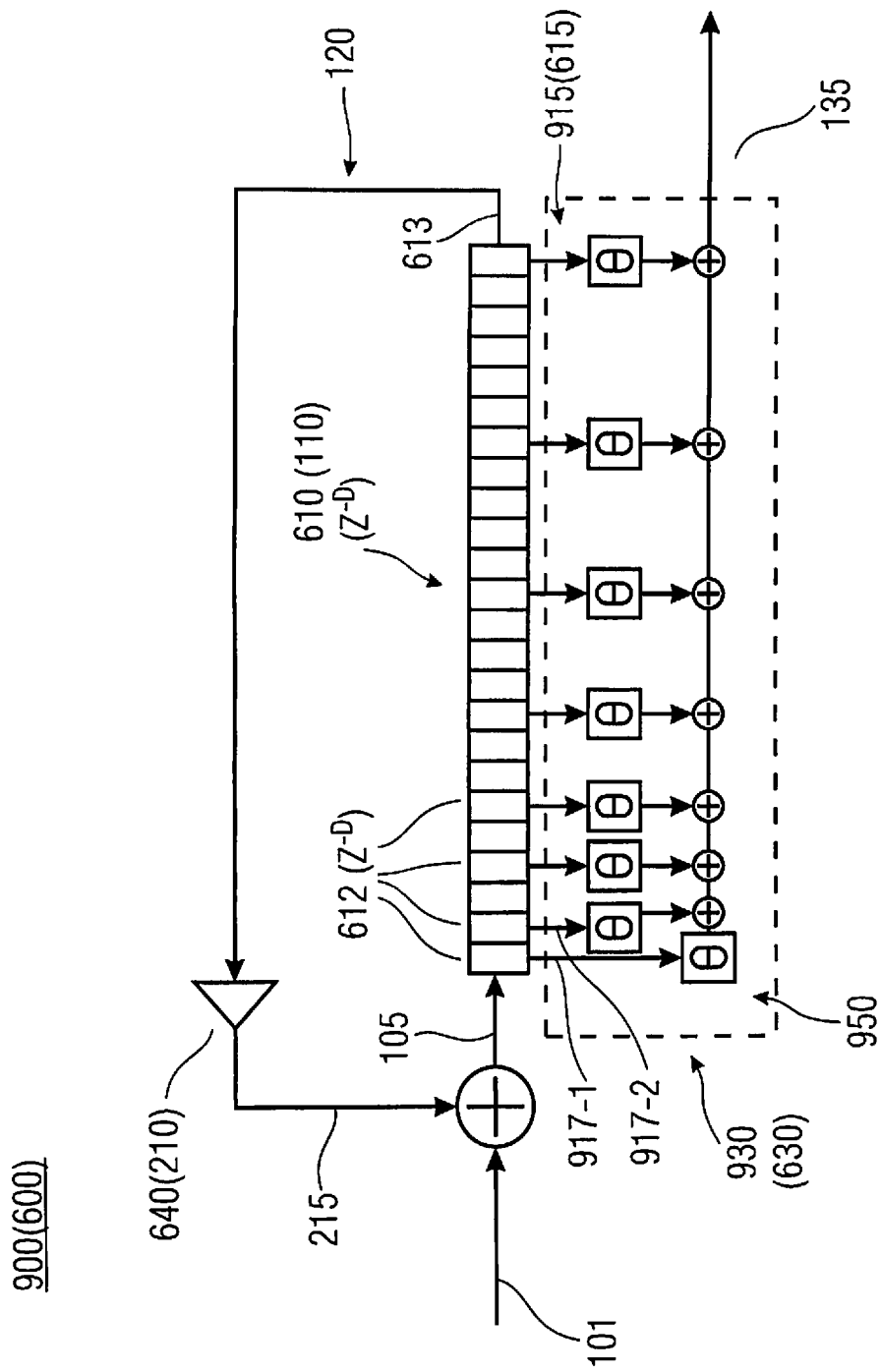
FIG. 9 shows a block diagram of a further embodiment of a single subband reverberation unit with sparse delay line outputs and multiplication-free phase operations.

FIG. 9 shows a block diagram of a further embodiment of a single subband reverberation unit 900 with sparse delay line outputs and multiplication-free phase operations. The single subband reverberation unit 900 of FIG. 9 essentially comprises the same blocks as the single subband reverberation unit 600 of FIG. 6. Therefore, identical blocks having similar implementations and/or functions are denoted by the same numerals. However, the combiner 930 of the single subband reverberation unit 900, which may correspond to the combiner 630 of the single subband reverberation unit 600, comprises a plurality 950 of phase modification units indicated by 'θ'-blocks. Here, each phase modification unit (θ-block) is connected to an individual delay line output (tap) of the plurality 915 of delay line outputs (taps), which may correspond to the at least three delay line outputs 615 of the single subband reverberation unit 600 as shown in FIG. 6. In the FIG. 9 embodiment, the plurality 950 of phase modification units is especially configured for modifying phases of the delay line tap output signals, wherein the phase modification for a first delay line tap output 917-1 can be different from a phase modification for a second delay line tap output 917-2. By applying different phase modifications for the plurality 915 of delay line tap outputs, an overall phase variation will be introduced into the reverberated frequency subband signal 135 at the output of the combiner 930.

Therefore, although having only sparse delay line outputs without multipliers for generating unity impulses with decaying density already produces a reasonable result, the quality of the reverberation algorithm can be greatly increased by adding phase variation to the response. In particular, the impulse response obtained with the single subband reverberation unit 900 as the result of the added phase variation will essentially be characterized by a higher quality as compared to the impulse response obtained with the single subband reverberation unit 600. However, applying arbitrary phase modifications would remove or at least decrease the previously achieved computational benefit obtained with the reverberation algorithm provided by the single subband reverberation unit 600 as compared to that of the single subband reverberation unit 300. This, however, can efficiently be avoided by restricting the phase modifications to k·π/2, where k is an integer number (k=0, 1, 2, 3 . . . ), so that a phase operation performed by a O-block reduces to simple feeding of the real and imaginary parts of an input signal to the real and imaginary parts of the output as shown in the table of FIG. 10.

FIG. 10 shows a table 1000 of exemplary multiplication-free phase operations employed by the embodiment of the single subband reverberation unit 900 in accordance with FIG. 9. In particular, the first column 1010 of the table 1000 represents multiplication-free phase operations k·π/2 for k=0 (1012), k=1 (1014), k=2 (1016) and k=3 (1018), respectively, each having a periodicity of k·2π. Moreover, the second and third column 1020, 1030 of the table 1000 represent the real part ('output real part') and imaginary part ('output imaginary part') of the output, which are directly related to the real part ('Input real') and imaginary part ('input imag') of the input signal, for the corresponding multiplication-free phase operations (lines 1012, 1014, 1016, 1018).

FIGS. 11*a*; 11*b*; 11*c*; 11*d* show block diagrams of different embodiments of a phase modification unit 1110; 1120; 1130; 1140, which may correspond to a phase modification unit of the plurality 950 of phase modification units employed by the single subband reverberation unit 900 shown in FIG. 9. In particular, the plurality 950 of phase modification units may be configured to be operative on the delay line tap output signals, wherein each phase modification unit 1110; 1120; 1130; 1140 of the plurality 950 of phase modification units may comprise a first phase modification unit input 1112-1; 1122-1; 1132-1; 1142-1 for a real part of a respective delay line tap output signal or a second phase modification unit input 1112-2; 1122-2; 1132-2; 1142-2 for an imaginary part of the respective delay line tap output signal and a first phase modification unit output 1114-1; 1124-1; 1134-1; 1144-1 for the real part of a phase modified output signal or a second phase modification unit output 1114-2; 1124-2; 1134-2; 1144-2 for the imaginary part of the phase modified output signal.

In FIG. 11*a*, the first phase modification unit input 1112-1 is directly connected to the first phase modification unit output 1114-1 and the second phase modification unit input 1112-2 is directly connected to the second phase modification unit output 1114-2.

In FIG. 11*b*, the second phase modification unit input 1122-2 is directly connected to the first phase modification unit output 1124-1 and the first phase modification input 1122-1 is connected to an interconnected sign inverter 1125, which is connected to the second phase modification unit output 1124-2. Therefore, according to the FIG. 11*b* embodiment, the real part of the phase modified output signal will be based on the imaginary part of the respective delay line tap output signal and the imaginary part of the phase modified output signal will be based on a sign-inverted real part of the respective delay line tap output signal.

In FIG. 11*c*, the first phase modification unit input 1132-1 is connected to an interconnected sign inverter 1135-1, which is connected to the first phase modification unit output 1134-1 and the second phase modification unit input 1132-2 is connected to an interconnected sign inverter 1135-2, which is connected to the second phase modification unit output 1134-2. Therefore, according to the FIG. 11*c* embodiment, the real part of the phase modified output signal will be based on a sign-inverted real part of the respective delay line tap output signal and the imaginary part of the phase modified output signal will be based on a sign-inverted imaginary part of the respective delay line tap output signal.

In FIG. 11*d*, the first phase modification unit input 1142-1 is directly connected to the second phase modification unit output 1144-2 and the second phase modification unit input 1142-2 is connected to an interconnected sign inverter 1145, which is connected to the first phase modification unit output 1144-1. Therefore, according to the FIG. 11*d* embodiment, the imaginary part of the phase modified output signal will be based on the real part of the respective delay line tap output signal and the real part of the phase modified output signal will be based on a sign-inverted imaginary part of the respective delay line tap output signal.

The possible phase operations (phase modifications) performed by the different phase modification units 1110; 1120; 1130; 1140 can be referred to as being multiplication-free, because the output (i.e. the phase modified output signal) can be directly derived from the input signal (i.e. the delay line output signal) as has been previously described without necessitating application of a (complex) phase multiplier to the signal. The phase modification units 1110; 1120; 1130; 1140 therefore represent computationally efficient phase modification units.

Figure 12:
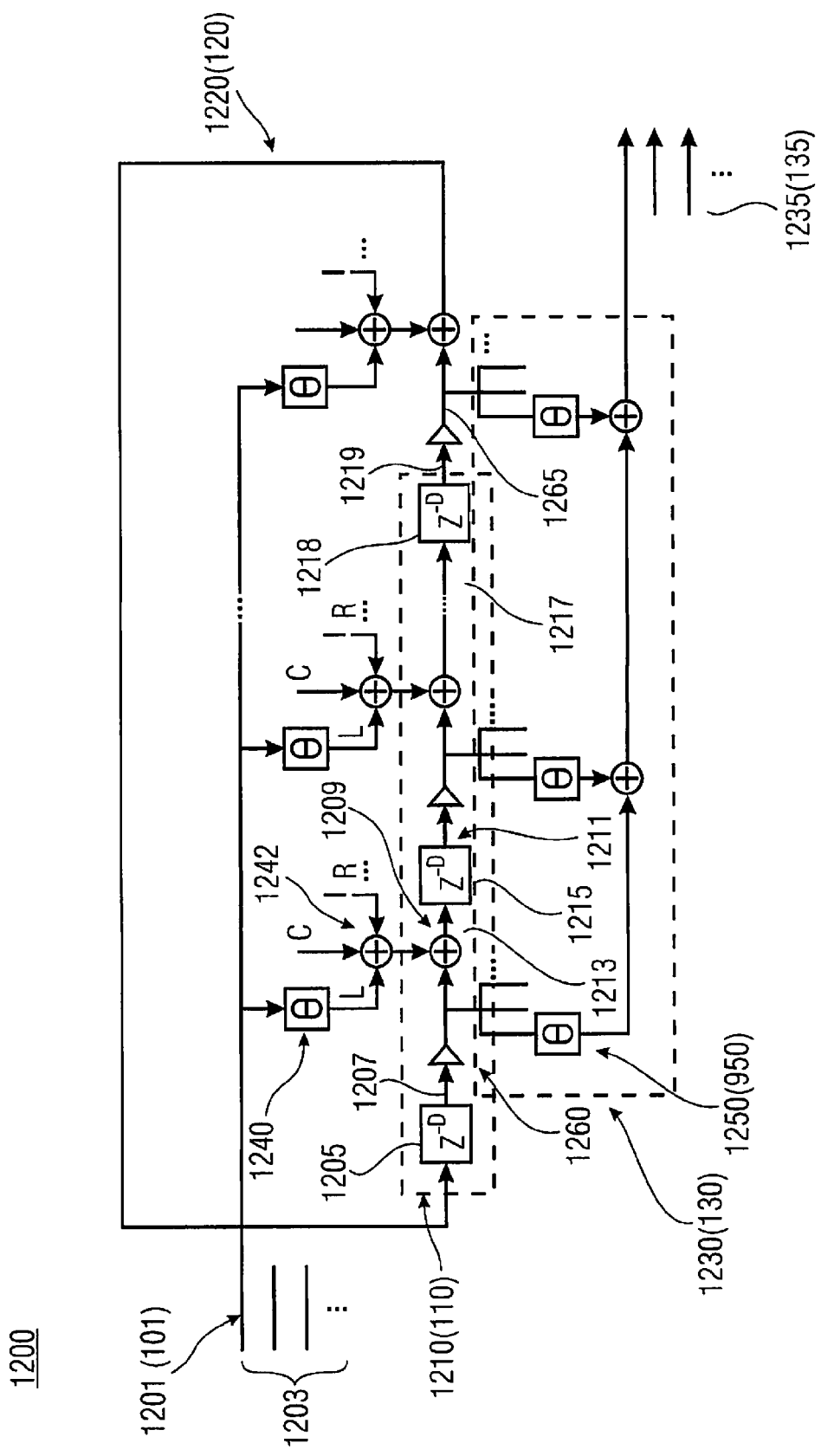
FIG. 12 shows a block diagram of a further embodiment of a single subband reverberation unit with serially connected delay line units, intermediate multipliers, delay line inputs and delay line outputs.

FIG. 12 shows a block diagram of a further embodiment of a single subband reverberation unit 1200 with serially connected delay line units ($z^{-D}$), intermediate multipliers 1260, delay line (tap) inputs 1209 and delay line (tap) outputs 1211. As shown in FIG. 12, the delay line 1210 of the single subband reverberation unit 1200 comprises a plurality of serially connected delay line units) ($z^{-D}$) for successively delaying an attenuated signal or the audio signal represented by the frequency subband signal 1201 fed into different delay line inputs, respectively, wherein each delay line unit of the delay line 1210' has a respective delay line output for a successively delayed signal. Furthermore, the single subband reverberation unit 1200 comprises a plurality 1260 of intermediate multipliers each connected with a delay line output 1207 of a first delay line unit 1205 and a corresponding delay line input 1213 of a second consecutive delay line unit 1215. In particular, the plurality of serially connected delay line units ($z^{-D}$) of the delay line 1210 shown in FIG. 12 may correspond to the plurality of serially connected delay line units ($z^{-D}$) of the delay line 610 shown in FIG. 9.

In the FIG. 12 embodiment, the plurality 1260 of intermediate multipliers is especially adjusted for multiplying successively delayed signals output from the plurality of serially connected delay line units ($z^{-D}$) with intermediate attenuation factors to obtain intermediate multiplier output signals and for supplying the intermediate multiplier output signals to the combiner 1230, which may correspond to the combiner 130 of FIG. 1c, and to corresponding delay line inputs of consecutive delay line units within the delay line 1210. Here, the intermediate multipliers 1260 may, for example, be configured as real multipliers. The feedback loop 1220, which may correspond to the feedback loop 120 of FIG. 1c, may be configured for receiving a delayed signal from a last intermediate multiplier output 1265 of the plurality 1260 of intermediate multipliers, wherein the delayed signal from the last intermediate multiplier output 1265 will have an attenuation corresponding to an effective attenuation factor based on the number of the intermediate multipliers 1260 and the individually applied intermediate attenuation factors. In particular, the plurality 1260 of intermediate multipliers may be configured to provide an effective attenuation factor corresponding to the attenuation factor ($b = a^N$) applied by the feedback loop 120 such as within the single subband reverberation unit 900 shown in FIG. 9. The single subband reverberation unit 1200 may also comprise a plurality 1250 of phase modification units, which may correspond to the phase modification units 950 shown in FIG. 9.

Referring to the embodiment of FIG. 12, the partial delay amount D introduced by each delay line unit of the plurality of serially connected delay line units) ($z^{-D}$) may correspond to a specific delay by one sample or time slot. In the FIG. 12 embodiment, the plurality of delay line output taps corresponding to the delay line outputs 1211 may not be fully populated. This means that only some output taps of the plurality of serially connected delay units may be connected to the combiner 1230. In addition, the plurality of intermediate multipliers 1260 may also not be fully populated.

According to the FIG. 12 embodiment, at least two delay line units 1215, 1218 of the plurality of serially connected delay line units) ($z^{-D}$) may have corresponding delay line inputs 1213, 1217 for receiving the audio signal represented by the frequency subband signal 1201 in parallel. Here, the frequency subband signal 1201 shown in FIG. 12 may correspond to the frequency subband signal 101 shown in FIG. 1c.

In the embodiment of FIG. 12, the audio signal may consist of several input audio channels $Ch_1$, $Ch_2$, $Ch_3$ . . . , e.g., denoted by 'L' (left), 'R' (right) and 'C' (center). Moreover, each input audio channel of the several input audio channels comprises the frequency subband signal 1201 of a plurality 1203 of different frequency subband signals.

As depicted in FIG. 12, the several input audio channels $Ch_1$, $Ch_2$, $Ch_3$, . . . (e.g. L, R, C) can be processed differently by preconnected phase modification units before being fed into corresponding delay line inputs of the plurality of serially connected delay line units) ($z^{-D}$). Here, the plurality 1240 of preconnected phase modification units may be configured to apply multiplication-free phase operations which are different for the different input audio channels ($Ch_1$, $Ch_2$, $Ch_3$, . . . ).

Therefore, in embodiments, the single subband reverberation unit 1200 may be configured for preprocessing a respective frequency subband signal of the several input audio channels (L, R, C) differently to obtain different preprocessed signals. In particular, the respective frequency subband signal of the several input audio channels (L, C, R) can be preprocessed by using different phase modification units 1240 for applying different phase modifications for several input audio channels L, C, R before feeding the preprocessed signals into corresponding delay line inputs of the plurality of serially connected delay line units ($z^{-D}$).

Specifically, as can be seen in FIG. 12, the single subband reverberation unit 1200 may further comprise a plurality 1240 of connected phase modification units (O-blocks) each connected to a corresponding delay line input of the plurality of serially connected delay line units ($z^{-D}$), so that phase modifications will be applied to the frequency subband signal 1201 that can be injected in parallel into different delay line inputs. Here, it is to be noted that the phase modification units 1240, 1250 may correspond to efficient phase modification units such as described in FIG. 11.

According to further embodiments, the preprocessed signals for the several channels (L, R, C) of the audio signal may be added prior to injecting same into the corresponding delay line inputs 1213, 1217. Such an adding operation is exemplarily indicated in FIG. 12 by '+'-symbols 1242 being operative on the L, C, R-channels.

According to further embodiments, the delay line 1210 may be configured so that a sum of a number of delay line inputs 1209 for receiving the audio signal 1201 and a number of the delay line outputs 1211 will be smaller than a number of individual elementary delay slots of the delay line 1210.

At the output of the combiner 1230 as shown in FIG. 12, a reverberated frequency subband signal 1235 of a plurality of different reverberated frequency subband signals can be obtained, wherein the reverberated frequency subband signal 1235 may correspond to the reverberated frequency subband signal 135 of the previous embodiments.

In other words, the audio channels (L, R, C) of the audio signal may be spectrally decomposed into a plurality of different frequency subband signals the exemplary single subband reverberation unit 1200 is operative on. Therefore, FIG. 12 essentially relates to a specific structure of a frequency-band single subband reverberation unit with delay line inputs (input taps), delay line outputs (output taps) and intermediate attenuation factors. Here, the phase modification units may also be zero multipliers.

In embodiments, a frequency domain reverberation algorithm realized with the frequency-band single subband reverberation unit can be based on arbitrary injection of the input signals from multiple channels into any point of the delay line. It can also be used to generate multiple output channels from the pickups of the delay line. According to further embodiments, the efficient phase modification units and the real multipliers within the reverberation structure may be replaced by time-variant or invariant complex multipliers. Moreover, the order of the delay line units, intermediate multipliers (gains), pickup points, and entry points may be interchangeable. In particular, when the channel-specific injection vectors are configured to be orthogonal, the single subband reverberation unit will be enabled to treat coherent and incoherent parts of the input signals equally. In the case that the output weighting vectors are configured to be orthogonal, incoherent output channels can be produced. Here, the output weighting vectors may correspond to attenuated (weighted) signals output by the plurality of intermediate multipliers each placed after its corresponding delay line unit. In case the injection vectors are configured to be orthogonal to the output weighting vectors, energy peaks at the beginning of the impulse response repetitions may be prevented.

According to further embodiments, the in-one-loop energy decay may be controlled by adjusting the gains between the delay line units and/or by having the density of the output pickups reduced. However, regardless of the applied method, the target is to obtain an energy decay rate according to a given reverberation time.

In other words, the reverberation structure may utilize the possibility to inject the input signal with phase modifications into the delay line. Here, it can be beneficial to inject the input signal in parallel into the delay line, because the impulse response of the system denses by a factor corresponding to the number of the delay line inputs (input taps). This especially allows reduction of the delay line outputs (output taps), and permits to have equal impulse response density with less memory excesses and additions. Optimally, the delay length in each frequency band may be adjusted to be in the same range as the number of input taps times the number of output taps. According to further embodiments, the input and the output tap positions can be randomly distributed using a uniform distribution. In addition, both the overall delay length and the input and output tap positions can be different in each frequency band. A further approach is to make use of real multipliers between the delay line units to provide an energy decay according to the reverberation time.

Since the embodiment of FIG. 12 has much computational overhead, it can be reduced to a number of specific and efficient reverberation structures. One of these is, for example, the sparse filter structure described in the FIG. 9 embodiment.

The above different embodiments (FIGS. 1c; 2a; 3; 6; 9; 12) were related to single subband reverberation units being operative on a single or individual frequency subband signal of the at least two different frequency subband signals, while, in the following, different embodiments of reverberators being configured to differently process the at least two different frequency subband signals will be described.

Figure 13:
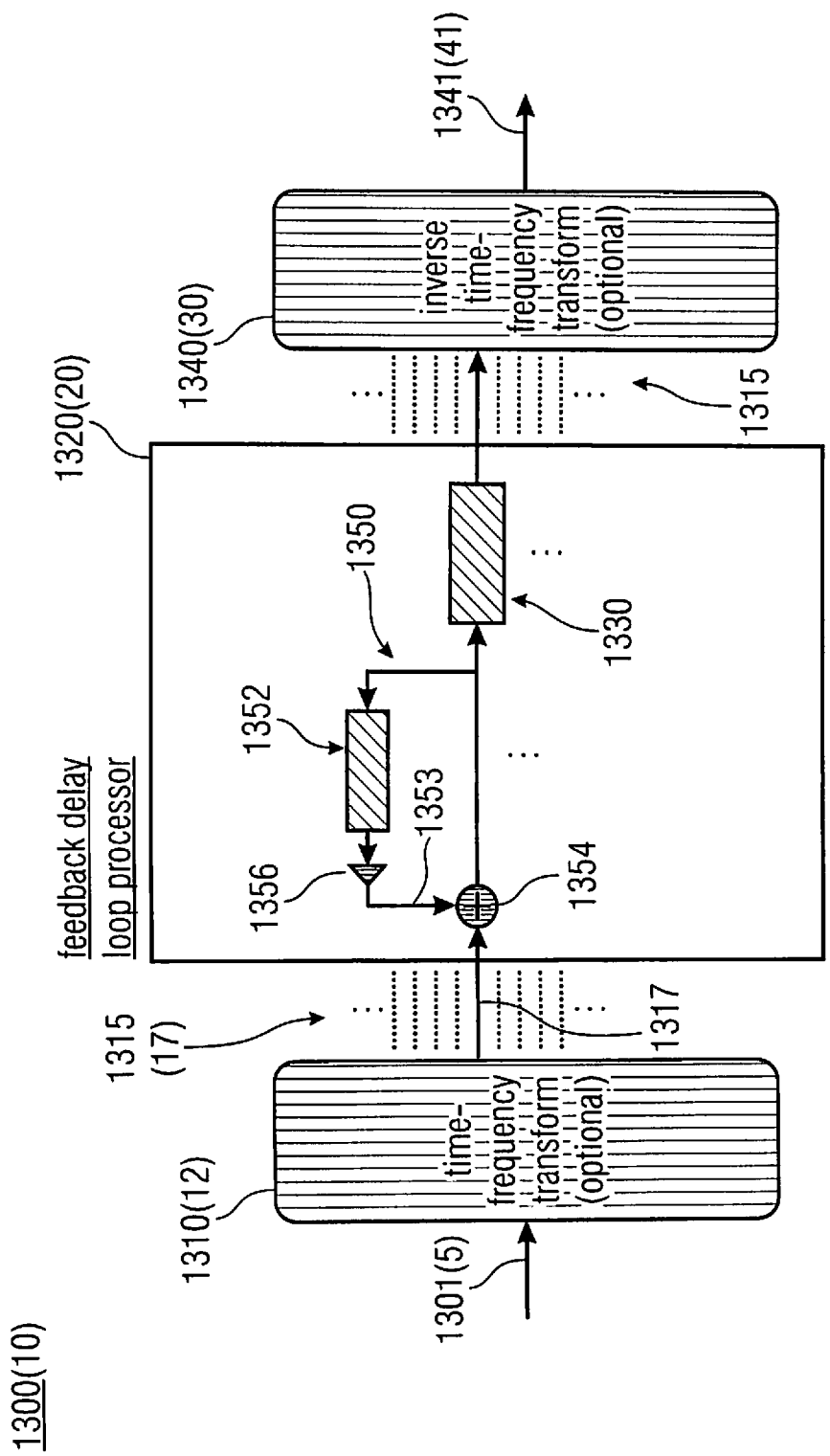
FIG. 13 shows a conceptual structure of an embodiment of a reverberator for reverberating an audio signal operative in a frequency domain.

FIG. 13 shows a conceptual structure of an embodiment of the reverberator 1300 operative in a frequency domain. The reverberator 1300 of FIG. 13 can especially be used to perform the reverberation algorithm in frequency bands. In particular, the reverberator 1300 shown in FIG. 13 may correspond to the reverberator 10 shown in FIG. 1a. Here, it is to be noted that the reverberator 1300 of FIG. 13 may comprise a plurality of single subband reverberation units as described previously, wherein each single subband reverberation unit of the plurality of single subband reverberation units may be operative on an individual frequency subband signal of a plurality of frequency subband signals, and wherein the plurality of single subband reverberation units may be configured to process the frequency subband signals differently, to obtain a plurality 1335 of reverberated frequency subband signals.

Referring to the embodiment of FIG. 13, the reverberator 1300 comprises a feedback delay loop processor 1320, which may correspond to the feedback delay loop processor 20 shown in FIG. 1a. Optionally, the reverberator 1300 shown in FIG. 13 may also comprise a first spectral converter 1310, which may correspond to the filterbank 12 of the reverberator 10 shown in FIG. 1a, and a second spectral converter 1340, which may correspond to the output processor 30 of the reverberator 10 shown in FIG. 1a. Here, the first and second spectral converters 1310, 1340 are indicated by "time-frequency transform (optional)" and "inverse time-frequency transform (optional)", respectively. The first spectral converter 1310 may be configured for converting the audio signal 1301 into a spectral representation having a plurality 1315 of different frequency subband signals. Here, the audio signal 1301 and the plurality 1315 of different frequency subband signals in the embodiment of FIG. 13 may correspond to the audio signal 5 and the at least two different frequency subband signals 17 in the embodiment of FIG. 1a. As depicted in FIG. 13, the feedback delay loop processor 1320 may comprise, for each frequency subband signal 1317 of the plurality 1315 of different frequency subband signals, a feedback loop 1350 and a diffuseness filter 1330 having a plurality of delay line taps. It can be seen in FIG. 13 that the feedback loop 1350 comprises a delay element 1352 determining the loop delay for the frequency subband signal to obtain a feedback signal 1353. In particular, the feedback loop 1350 may comprise an adder 1354 for adding the frequency subband signal 1317 and the feedback signal 1353. As can be seen in FIG. 13, the adder 1354 is connected to the diffuseness filter 1330. Specific to the embodiment of FIG. 13 is that the delay elements of the feedback loops can be different for the at least two different frequency subband signals (signals 1315).

According to further embodiments, the feedback delay loop processor 1320 of the reverberator 1300 may comprise a feedback loop 1350 for each frequency subband signal 1317 of the at least two frequency subband signals, wherein the feedback loop 1350 for a frequency subband signal 1317 may comprise a delay element 1352 and additionally, an attenuator 1356. Here, the delay elements and also the attenuators may be different for the at least two different frequency subband signals.

The second spectral converter 1340 of the reverberator 1300 may optionally be used to combine the plurality of reverberated frequency subband signals 1335 to obtain the reverberated audio signal 1341 having a combined bandwidth. The reverberated audio signal 1341 obtained with the reverberator 1300 of FIG. 13 may correspond to the reverberated audio signal 41 of the reverberator 10 of FIG. 1a.

In other words, a single subband reverberation unit of the reverberator 1300 or frequency domain reverberation structure may comprise a (decaying) impulse train generator (feedback loop 1350) and a (short-time) diffuseness filter 1330 enclosed within two (optional) spectral converters 1310, 1340 for performing a time-frequency transform and an inverse time-frequency transform, respectively. The transform operation (blocks 1310, 1340) are optional and shown for illustration purposes only since the audio signal in the application may be already in the frequency transform domain. In the transform domain, the order of the processing blocks is interchangeable since the processing is linear. All factors included can be different in different frequency bands. Here, the different frequency bands are illustrated by dotted lines at the output of the time-frequency transform converter 1310 and the input of the inverse time-frequency transform converter 1340, respectively.

As described previously, the reverberation structure (reverberator 1300) includes a plurality of different one-input-one-output reverberation units and therefore works for multiple inputs and outputs or different frequency subband signals. Conceptually, creating multiple outputs can be achieved by having multiple diffuseness filters that are mutually incoherent. In FIG. 13, the decaying impulse train generator 1350 (feedback loop) may be configured to create an infinite exponentially decaying sparse equal interval response which defines the repeating interval of the reverberation in that particular band. The diffuseness filter 1330, which may be an FIR (finite impulse response) or IIR (infinite impulse response) filter structure, may in turn be used to create a short-time diffuse characteristics in the response. This structure allows the diffuseness filter 1330 to be short and thus computationally efficient. The feedback loop makes the overall response infinitely attenuating, and the diffuseness filter makes the short time envelope attenuating according to the same factor.

There is no specific constraint to the delay line length of the diffuseness filter. In embodiments, the design goal is to make the length of the delay line as short as possible so as to allow for a minimum memory usage and computational cost in the diffuseness filter, while keeping the negative perceptual effect of the repeating structure minimal.

The diffuseness filter can be designed in many ways. It can, for example, be designed as an "ideal reverberation" diffuseness filter in the form of a short-time diffuse filter by decaying white noise (design method of FIG. 3) or as an efficient diffuseness filter by means of a sparse filter with decaying density and unity gains with multiplication-free phase operations (design method of FIG. 9). Here, the diffuseness filter design method of FIG. 9 is by informal listening perceptually equal to the method of FIG. 3, while having significant computational savings. Thus, the method of FIG. 9 may be advantageous compared to the method of FIG. 3. In particular, the sparse filter-based implementation such as within the embodiments of FIGS. 6; 9; 12 represent a more practical implementation of a reverberation algorithm.

In embodiments, the reverberation structure essentially uses a common delay line, which is shared by the feedback delay loop and the diffuseness filter (e.g. an FIR sparse filter). Other types of diffuseness filters can also be built similarly.

Referring to the embodiments of FIGS. 3; 6; 9; 12, the delay line including the plurality of serially connected delay line units may consist of at least 15, advantageously at least 20, and less than 200, advantageously less than 100 individual delay line units (delay line slots).

According to further embodiments, the diffuseness filter 1330 shown in FIG. 13 or the delay line 110 shown in FIG. 1c are typically complex-valued devices.

Figure 14:
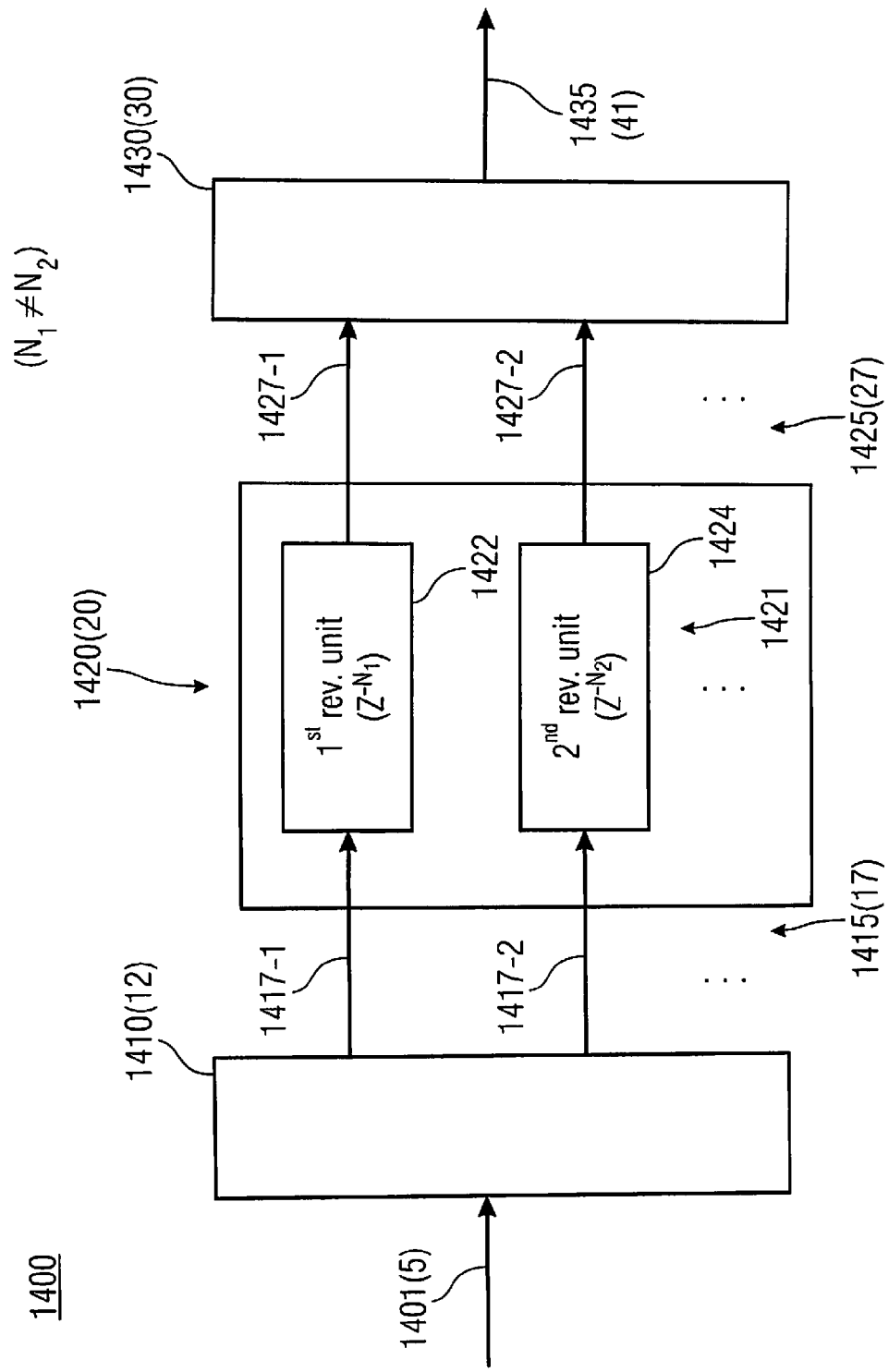
FIG. 14 shows a block diagram of an embodiment of a reverberator for reverberating an audio signal with a spectral converter, several different single subband reverberation units and an output processor.

FIG. 14 shows a block diagram of an embodiment of a reverberator 1400 for reverberating an audio signal with a spectral converter, a feedback delay loop processor including several different single subband reverberation units and an output processor. As shown in FIG. 14, the reverberator 1400 comprises the spectral converter 1410, the feedback delay loop processor 1420 and the output processor 1430. Here, the spectral converter 1410, the feedback delay loop processor 1420 and the output processor 1430 of the reverberator 1400 shown in FIG. 14 may correspond to the filterbank 12, the feedback delay loop processor 20 and the output processor 30 of the reverberator 10 shown in FIG. 1a. The spectral converter 1410 may be configured for converting the audio signal 1401, which may correspond to the audio signal 5 of FIG. 1a, into a plurality 1415 of different frequency subband signals, which may correspond to the at least two different frequency subband signals 17 of FIG. 1a. In the embodiment of FIG. 14, the feedback delay loop processor 1420 comprises a plurality 1421 of single subband reverberation units, which are configured for processing the different frequency subband signals 1415, to obtain reverberated frequency subband signals 1425. In particular, a first single subband reverberation unit 1422 of the feedback delay loop processor 1420 may be configured to provide a first total delay amount $N_1$ for a first frequency subband signal 1417-1 of the plurality 1415 of different frequency subband signals to obtain a first reverberated frequency subband signal 1427-1, while a second single subband reverberation unit 1424 of the feedback delay loop processor 1420 may be configured to provide a second different total delay amount $N_2$ for a second frequency subband signal 1417-2 of the plurality 1415 of different frequency subband signals to obtain a second reverberated frequency subband signal 1427-2. The output processor 1430 may be configured for processing the reverberated frequency subband signals 1425 to obtain a reverberated audio signal 1435 such as described previously. Here, the reverberated frequency subband signals 1425 and the reverberated audio signal 1435 obtained at the output of the output processor 1430 may correspond to the reverberated frequency subband signals 27 and the reverberated audio signal 41 at the output of the output processor 30 shown in FIG. 1a, respectively.

The spectral converter 1410 may, for example, be configured as a QMF analysis filterbank or for performing a short-time Fourier transform (STFT), while the output processor 1430 may, for example, be configured as a QMF synthesis filter bank or for performing an inverse short-time Fourier transform (ISTFT).

In embodiments, the frequency-domain signal representation can be in a real or complex domain. Therefore, all operations performed within the reverberator (e.g. delay, sum or multiplication) can be real or complex operations.

According to further embodiments, the spectral converter 1410 or filterbank 12 may also be implemented as a real-valued device. Possible applications of such a real-valued filterbank can, for example, be modified discrete cosine transforms (MDCT) in audio coding, or low-power modes in MPEG Surround, where a lower part of the QMF bands might be complex, and higher bands might be only real-valued. In such scenarios, there could be environments where at least part of the subbands are only real-valued and where it would be beneficial to apply a reverb like this. In these cases, the signal is real and the possible phase modifications (e.g. efficient phase modifications such as described in FIGS. 11a to d) are only 1 and −1, corresponding to a multiplication of the real signal by multipliers 1 or −1, respectively.

By using different total delay amounts ($N_1 \neq N_2$) for the plurality 1415 of frequency subband signals, a repetitiveness of the impulse response can be significantly reduced due to different resulting repeating intervals for the different frequency subband signals.

Referring to the embodiments of FIGS. 1c and 14, the feedback delay loop processor 1420 may comprise for each frequency subband signal of the at least two frequency subband signals 1415 a delay line 110 having a plurality 115 of delay line taps providing signals delayed by different tap delays, a feedback loop 120 connected to the delay line 110 and a combiner 130 for combing signals output by the plurality 115 of delay line taps, to obtain the reverberated frequency subband signals 1425. In particular, the delay line 110 is configured to provide a total delay amount which is higher than the highest tap delay. This total delay amount essentially determines the loop delay for the frequency subband signal. As depicted in FIG. 14, the total delay amounts $N_1$, $N_2$ provided by the first and second signal subband reverberation units 1422, 1424 of the feedback delay loop processor 1420 are different for the at least two different frequency subband signals 1415.

According to further embodiments, the feedback delay loop processor 20 of the reverberator 10 may comprise, for each frequency subband signal, a filter having a filter impulse response, such as the impulse response 800 shown in FIG. 8. As described previously, the filter impulse response 800 comprises a first block 815 of filter impulse response samples and a second block 825 of filter impulse response samples. Here, the second block 825 is similar to the first block 815 with regard to impulse response sample spacing, while a first impulse response sample 821 of the second block 825 will be delayed from a first impulse response sample 811 of the first block 815 by the loop delay for the frequency subband signal.

Moreover, the loop delay for the frequency subband signal provided by the filter essentially corresponds to a delay amount N defined by the first impulse response sample 821 of the second block 820 and the first impulse response sample 811 of the first block 815.

Thereby, at the output of the feedback delay loop processor 20, a plurality of different first and second blocks of filter impulse response samples for the at least two different frequency subband signals will be obtained. Specifically, the first blocks and the second blocks of the filter impulse responses of the filters for the frequency subband signals will be delayed by the different loop delays for the at least two different frequency subband signals.

Referring to the embodiments of FIGS. 6 and 14, the plurality 615 (115) of delay line taps may comprise a first part 619-1 of delay line taps and a second subsequent part 619-2 of delay line taps. In embodiments, the delay line 610 (110) of a single subband reverberation unit may be configured so that an average gap size between the taps of the second part 619-2 will be larger than the average gap size between the taps of the first part 619-1. Here, the average gap size corresponds to an average over successive delays between respective delay line taps of the plurality 615 (115) of delay line taps in the first or second subsequent part 619-1, 619-2 of delay line taps, respectively.

Referring to the embodiments of FIGS. 1c; 13 and 14, the diffuseness filter 1330 of the reverberator 1300 shown in FIG. 13 or the delay line 110 connected to the feedback loop 120 and the combiner 130 can especially be configured as a sparse filter 600 which is exemplarily shown in FIG. 6. As has been described before, the sparse filter 600 may have a filter density that can be varied in such a way that a filter impulse response (e.g. impulse response 700 of FIG. 7) of the sparse filter 600 will approximate a predetermined energy envelope (e.g. energy envelope 715 of FIG. 7).

According to further embodiments, the sparse filter may be implemented as in the embodiment of FIG. 9 (sparse filter 900) comprising a plurality 950 of phase modification units, wherein each phase modification unit of the plurality 950 of phase modification units is directly connected to an individual delay line tap of the plurality 915 of delay line taps, and wherein each phase modification unit is configured to apply a multiplication-free phase operation to a corresponding signal output by the individual delay line tap. In embodiments, the multiplication-free phase operation provided by a respective phase modification unit of the plurality 950 of phase modification units may, for example, be performed according to Table 1000 of FIG. 10. Here, the respective phase modification unit may be configured as an efficient phase modification unit as shown in FIGS. 11a-d. Referring to FIGS. 1c; 13 and 14, the diffuseness filter 1330 or the delay line 110 are typically complex-valued devices for separately processing real and imaginary parts of a complex signal representing the audio signal. Therefore, by using these complex-valued devices, the efficient phase modification units 1110; 1120; 1130; 1140 as shown in FIGS. 11a-d can be realized.

Referring to the embodiments of FIGS. 1a and 2a, the feedback delay loop processor 20 of the reverberator 10 may be configured to attenuate each frequency subband signal of the at least two frequency subband signals 17 by an attenuation factor b. As described before, the attenuation factor b may depend on a predetermined reverberation time $T_{60}$ and the loop delay for the frequency subband signal according to embodiments of the present invention. By such a measure, different attenuation factors for the at least two different frequency subband signals 17 can be applied by the feedback delay loop processor 20.

Figure 15:
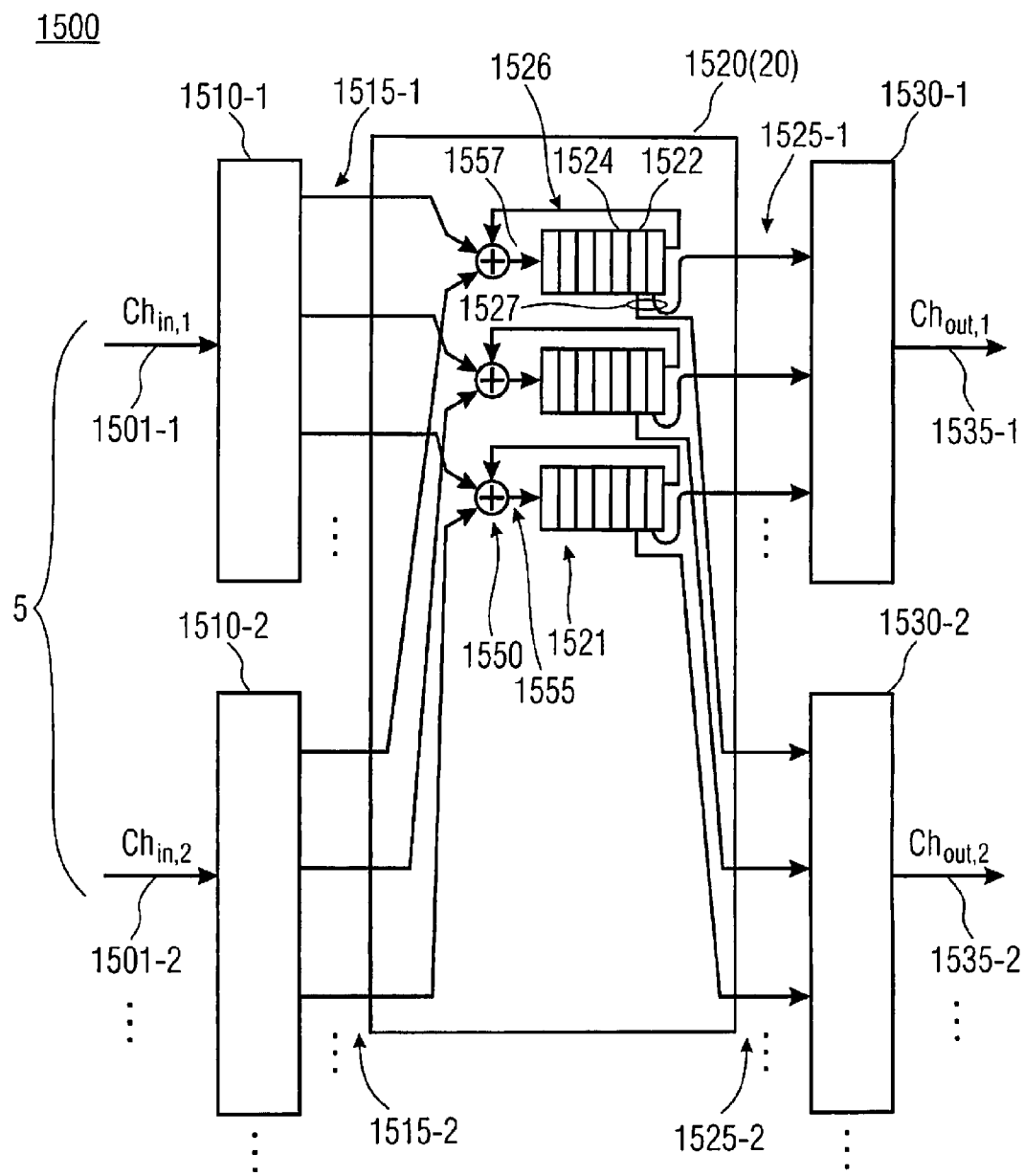
FIG. 15 shows a block diagram of a further embodiment of a reverberator for reverberating an audio signal with orthogonal channel specific output vectors.
Figure 16:
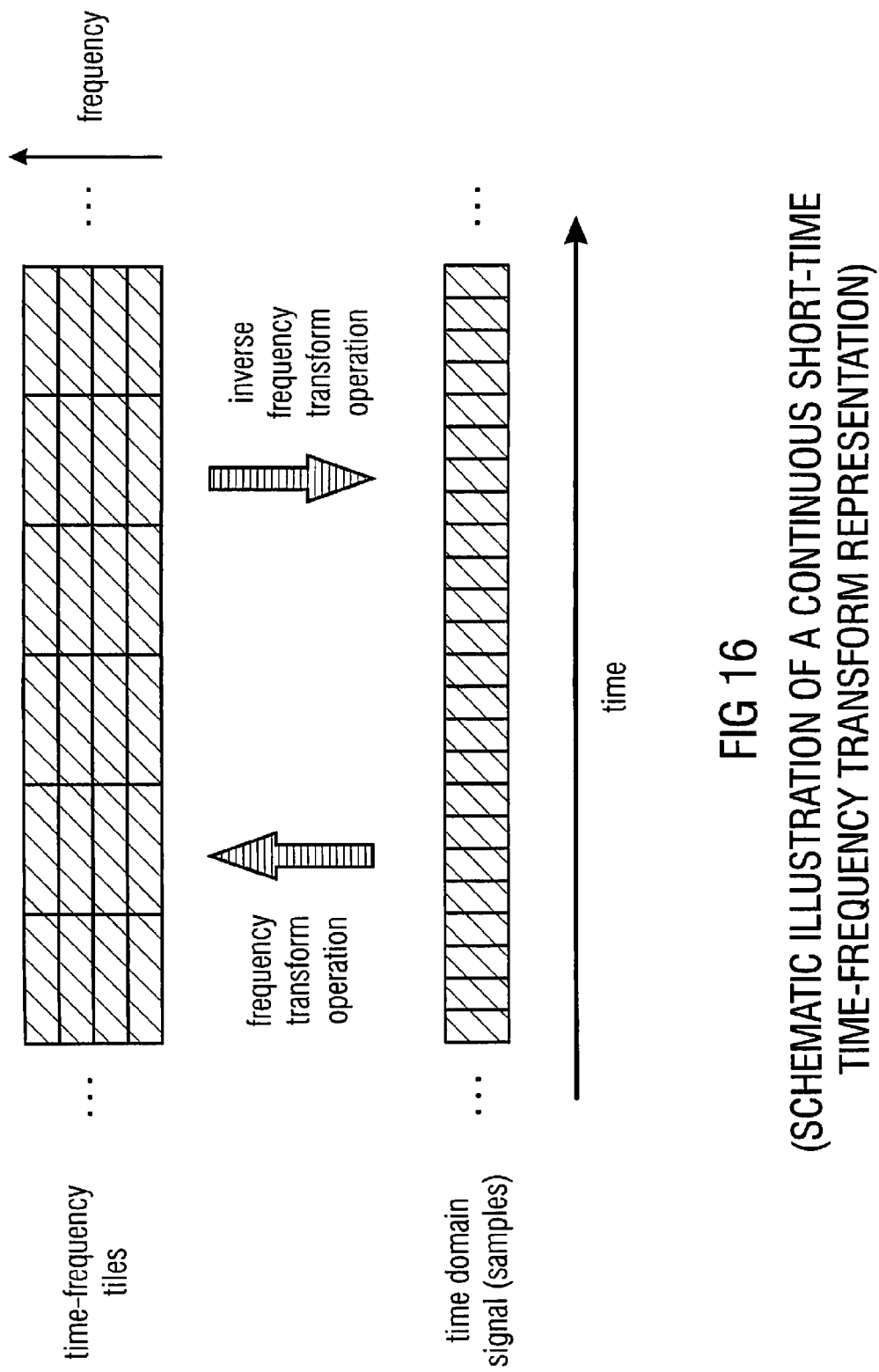
FIG. 16 shows a schematic illustration of a continuous short-time time-frequency transform representation according to an embodiment of the present invention.

FIG. 15 shows a block diagram of a further embodiment of a reverberator 1500 with orthogonal channel specific output vectors. In the embodiment of FIG. 15, the reverberator 1500 may comprise at least two spectral converters 1510-1, 1510-2 for a first and a second channel 1501-1, 1501-2 ($Ch_{in,1}$, $Ch_{in,2}$) of a plurality of input audio channels ($Ch_{in,1}$, $Ch_{in,2}$, ... ), wherein the at least two spectral converters 1510-1, 1510-2 may be configured as analysis filterbanks (e.g. filterbank 12 of FIG. 1a) to spectrally decompose the two channels 1501-1, 1501-2 into a first and a second plurality 1515-1, 1515-2 of different frequency subband signals, respectively. As shown in FIG. 15, a feedback delay loop processor 1520 (e.g. feedback delay loop processor 20 of FIG. 1a) may comprise a plurality 1550 of adders that can be used for adding corresponding frequency subband signals of the first and the second plurality 1515-1, 1515-2 of frequency subband signals together, to obtain added signals 1555 and for feeding the added signals 1555 into corresponding inputs of a plurality 1521 of single subband reverberation units. In particular, a single subband reverberation unit of the plurality 1521 of single subband reverberation units may comprise a delay line filter including a delay line 1526 providing at least two different filter tap positions 1522, 1524 for frequency subband signals 1525-1 of a first output audio channel $Ch_{out,1}$ and for frequency subband signals 1525-2 of a second output audio channel $Ch_{out,2}$, respectively.

Furthermore, the reverberator 1500 may comprise two output processors 1530-1, 1530-2 for providing a first and a second output channel 1535-1, 1535-2 ($Ch_{out,1}$, $Ch_{out,2}$) of an output audio signal, wherein the two output processors 1530-1, 1530-2 may be configured as synthesis filterbanks (e.g. QMF synthesis filterbanks). In particular, the first output processor 1530-1 may be set to synthesize a first plurality 1525-1 of signals output by a first delay line output or filter tap position 1522 of the plurality 1521 of single subband reverberation units, while the second output processor 1530-2 may be set to synthesize a second plurality 1525-2 of signals output by a second different delay line output or filter tap position 1524 of the plurality 1521 of single subband reverberation units.

Referring to the FIG. 15 embodiment, the audio signal 5 has the plurality of different input audio channels $Ch_{in,1}$, $Ch_{in,2}$, ..., wherein each input audio channel has at least two different frequency subband signals (signals 1515-1, 1515-2). Specifically, the delay line 1526 of the delay line filter as part of the feedback delay loop processor 1520 may comprise filter tap positions or phase modification units connected to at least some of the filter tap positions. The feedback delay loop processor 1520 further comprises a first output configuration for frequency subband signals 1525-1 of a first output audio channel 1535-1, $Ch_{out,1}$, and a second output configuration for frequency subband signals 1525-2 of a second output audio channel 1535-2, $Ch_{out,2}$. In the embodiment of FIG. 15, the feedback delay loop processor 1520 may be configured so that the first and second output configurations may comprise connections 1527 to different filter tap positions or phase modification units. Specifically, in the FIG. 15 embodiment, the first and second output configurations can be connected to the same delay line 1526.

Essentially, by using the same delay line 1526 for providing differently delayed frequency subband signals for the output audio channels generated from one input frequency subband signal, a number of the necessitated delay lines within the feedback delay loop processor 1520 can efficiently be reduced as compared to the case when two different delay lines are used for providing the differently delayed frequency subband signals generated from the one input frequency subband signal.

According to further embodiments, the feedback delay loop processor may also comprise a first input configuration for frequency subband signals of a first input audio channel and a second input configuration for frequency subband signals of a second input audio channel. In such embodiments, the feedback delay loop processor may be configured so that the first and second input configurations may comprise connections to different filter tap positions or phase modification units. Thereby, the first and second input configurations can be connected to a same delay line.

In embodiments, the number of input ($Ch_{in,1}$, $Ch_{in,2}$, ...) and output audio channels ($Ch_{out,1}$, $Ch_{out,2}$, ...) can be the same or be different.

Essentially, the reverberator 1500 of the FIG. 15 embodiment provides a reverberation algorithm being operative in the frequency domain, which is based on a subband-wise processing of two or more channels of the audio signal. As depicted in FIG. 15, the channel specific output vectors may, for example, be configured to be orthogonal to each other. Here, a channel specific output vector may be defined by the specific delay line outputs (pickup points or filter tap positions), which are used for the synthesis by a respective output processor. Referring to the FIG. 15 embodiment, the channel specific output vectors are orthogonal with respect to each other, because for the first and the second channel, different pickup points or filter tap positions 1522, 1524 can be used, respectively.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive processed audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein will be apparent to others skilled in the art. It is the intent; therefore, to be limited only by the scope of the impending patent claims and not by the specific details presented by way of description and explanation of the embodiments herein.

The present invention essentially provides a novel, computationally efficient structure for a reverberator which can be operative in a frequency transform domain. The benefits include an efficient implementation compared to existing frequency domain solutions and arbitrary control for reverberation times in frequency bands.

Embodiments of the present invention can be based on an algorithm, which operates in the frequency transform domain and has an individual process in each subband. Moreover, the impulse response of this algorithm may be infinitely repeating while exponentially attenuating in each frequency band.

In the following, the main benefits of embodiments of the present invention are described. The presented solution produces reverberation that is perceptually very close to the infinite frequency band-wise exponentially decaying white noise, which is considered to be a good reference for real diffuse reverberation. Moreover, the computational complexity of the provided system is very small, which is also the case for long reverberation times. In particular, an example implementation for processing all subbands needed only 2.2 real multiplications and 10 to 40 real additions (depending on the parameter $T_{60}$) per time domain sample.

The presented solution also allows completely free adjustment of the parameter $T_{60}$ individually in all frequency bands. This is important especially for room modeling and virtual acoustics since the parameter $T_{60}$ in frequency bands is an important property for human listeners in perceiving spaces, and in fact is a common measure in room acoustic measurements and simulation. Finally, the present solution works in the frequency domain. There are numerous modern audio processing technologies that have a demand for a good quality frequency domain reverberation algorithm.

In the following, some of the use cases of embodiments of the present invention are described. A use case relates to adding room effect in applications that function in a short-time frequency transform domain. An example of such applications are binaural decoding of MPEG Surround as described in "Multi-Channel Goes Mobile: MPEG Surround Binaural Rendering", Breebaart, Herre, Jun, Kjörling, Koppens, Plogsties, Villemoes, 29th AES conference, September 2006 and MPEG Surround standard ISO/IEC FDIS 23003-1, and SAOC as described in "Spatial Audio Object Coding (SAOC)—The Upcoming MPEG Standard on Parametric Object Based Audio Coding", Breebaart, Engdegård, Falch, Hellmuth, Hilpert, Hoelzer, Koppens, Oomen, Resch, Schujiers, Trentiev. These decoders benefit in having room effect in the hybrid QMF domain. The necessity of reverberators is motivated by the necessity to create natural listening experience to the listener using headphones. Another use case relates to upmixing. Similarly to binaural decoding, upmixing applications often work also in the frequency domain and may also use reverberators. Another use case relates to auralization in room acoustic design. Room acoustic software needs a reverberator with free control of $T_{60}$ to auralize the space (such as a concert hall) in the design phase. Another use case relates to game audio and VR. Successful creation of immersive experiences in virtual reality may depend on the ability to reproduce any given set of parameters $T_{60}$ correctly. Finally, another use case relates to audio effects. The proposed technique may overcome some limitations of the time domain reverberators. With help of a frequency transform and an inverse frequency transform operation, the proposed technique may be applied as an effect in sound design.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Reverberator for reverberating an audio signal, comprising:
   a feedback delay loop processor for delaying at least two different frequency subband signals representing the audio signal by different loop delays to acquire reverberated frequency subband signals, wherein each of the at least two different frequency subband signals is a different time-frequency tile derived from a time domain audio signal,
   wherein the feedback delay loop processor comprises for a first frequency subband signal of the at least two frequency subband signals a first delay line comprising a first plurality of delay line taps providing signals delayed by different tap delays, a first feedback loop connected to the first delay line and a first combiner for combining signals output by the first plurality of delay line taps, and
   wherein the feedback delay loop processor comprises for a second different frequency subband signal of the at least two frequency subband signals a second delay line comprising a second plurality of delay line taps providing signals delayed by different tap delays, a second feedback loop connected to the second delay line and a second combiner for combining signals output by the second plurality of delay line taps,
   wherein the feedback delay loop processor comprises, for each frequency subband signal, a feedback loop and a diffuseness filter comprising a plurality of delay line taps, wherein the feedback loop comprises a delay element determining the loop delay for the frequency subband signal to acquire a feedback signal, and wherein the feedback loop comprises an adder for adding the frequency subband signal and the feedback signal, the adder being connected to the diffuseness filter, wherein the delay elements are different for the at least two different frequency subband signals,
   wherein the diffuseness filter or the delay line connected to the feedback loop and the combiner are configured as a sparse filter, wherein the sparse filter comprises a filter tap density, wherein a filter impulse response of the sparse filter approximates a predetermined energy envelope,
   wherein the sparse filter comprises a plurality of phase modification units, wherein each phase modification unit of the plurality of phase modification units is directly connected to an individual delay line tap of the plurality of delay line taps, and wherein each phase modification unit is configured to apply a multiplication-free phase operation to a corresponding signal output by the individual delay line tap,
   wherein the diffuseness filter or the delay line are complex-valued devices, and wherein each phase modification unit of the plurality of phase modification units comprises a first phase modification unit input for a real part of a respective delay line tap output signal or a second phase modification unit input for an imaginary part of the respective delay line tap output signal and a first phase modification unit output for the real part of a phase modified output signal or a second phase modification unit output for the imaginary part of the phase modified output signal,
   wherein the second phase modification unit input is directly connected to the first phase modification unit output and the first phase modification input is connected to an interconnected sign inverter, which is connected to the second phase modification unit output, wherein the real part of the phase modified output signal is based on the imaginary part of the respective delay line tap output signal and the imaginary part of the phase modified output signal is based on a sign-inverted real part of the respective delay line tap output signal; or
   wherein the first modification unit input is connected to an interconnected sign inverter, which is connected to the first phase modification unit output, and the second phase modification unit input is connected to an interconnected sign inverter, which is connected to the second phase modification unit output, wherein the real part of the phase modified output signal is based on a sign-inverted real part of the respective delay line tap output signal and the imaginary part of the phase modified output signal is based on a sign-inverted imaginary part of the respective delay line tap output signals; or wherein the first modification unit input is directly connected to the second phase modification unit output and the second phase modification input is connected to an interconnected sign inverter, which is connected to the first phase modification unit output, wherein the imaginary part of the phase modified output signal is based on the real part of the respective delay line tap output signal and the real part of the phase modified output signal is based on a sign-inverted imaginary part of the respective delay line tap output signal.

2. The reverberator according to claim 1, further comprising an output processor for processing the reverberated frequency subband signals to acquire a reverberated audio signal.

3. The reverberator according to claim 1, wherein the output processor performs mixing the at least two frequency subband signals and the corresponding reverberated frequency subband signals to acquire mixed signals and to combine the mixed signals, or combining the reverberated frequency subband signals to acquire the reverberated audio signal comprising a combined bandwidth.

4. The reverberator according to claim 1, wherein the feedback delay loop processor comprises, for each frequency subband signal, a filter comprising a filter impulse response, wherein the filter impulse response comprises a first block of filter impulse response samples and a second block of filter impulse response samples, the second block being similar to the first block with regard to impulse response sample spacing, wherein the first impulse response sample of the second block is delayed from the first impulse response sample of the first block by the loop delay for the frequency subband signal, and wherein the first blocks and the second blocks of the filter impulse responses of the filters for the frequency subband signals are delayed by the different loop delays.

5. The reverberator according to claim 1, wherein the feedback delay loop processor comprises a feedback loop for each frequency subband signal of the at least two frequency subband signals, wherein the feedback loop for a frequency subband signal comprises a delay element and an attenuator, wherein the delay elements are different with respect to their loop delays for the at least two different frequency subband signals.

6. The reverberator according to claim 1, wherein the feedback delay loop processor performs acquiring the reverberated frequency subband signals, wherein the delay line comprises a total delay amount being higher than the highest tap delay and determining the loop delay, wherein the total delay amounts are different for the at least two different frequency subband signals.

7. The reverberator according to claim 6, wherein the plurality of delay line taps comprises a first part of delay line taps and a second subsequent part of delay line taps, and wherein the delay line is configured so that an average gap size between the taps of the second part is larger than the average gap size between the taps of the first part.

8. The reverberator according to claim 1, wherein the feedback delay loop processor is configured so that the loop delay for a second frequency subband signal of the at least two frequency subband signals representing a lower frequency band is larger than the loop delay for a first frequency subband signal of the at least two frequency subband signals representing a higher frequency band.

9. The reverberator according to claim 1, wherein the audio signal comprises a plurality of different input or output audio channels, wherein each input or output audio channel comprises at least two different frequency subband signals, wherein the feedback delay loop processor comprises a delay line filter, a delay line of the delay line filter comprising filter tap positions or phase modification units connected to at least some of the filter tap positions, the feedback delay loop processor further comprising a first input or output configuration for frequency subband signals of a first input or output audio channel and a second input or output configuration for frequency subband signals of a second input or output audio channel, and wherein the feedback delay loop processor is configured so that the first and second input or output configurations comprise connections to different filter tap positions or phase modification units, and wherein the first and second input or output configurations are connected to the same delay line.

10. The reverberator according to claim 1, wherein the feedback delay loop processor performs attenuating each frequency subband signal of the at least two frequency subband signals by an attenuation factor, wherein the attenuation factor depends on a predetermined reverberation time and the loop delay for the frequency subband signal.

11. A method for reverberating an audio signal, comprising:

delaying at least two different frequency subband signals representing the audio signal by different loop delays by using a feedback delay loop processor to acquire reverberated frequency subband signals, wherein the feedback delay loop processor comprises for each frequency subband signal of the at least two frequency subband signals a first delay line comprising a plurality of delay line taps providing signals delayed by different tap delays, a first feedback loop connected to the first delay line and a first combiner for combining signals output by the plurality of delay line taps, and wherein the feedback delay loop processor comprises for a second different frequency subband signal of the at least two frequency subband signals a second delay line comprising a second plurality of delay line taps providing signals delayed by different tap delays, a second feedback loop connected to the second delay line and a second combiner for combining signals output by the second plurality of delay line taps, wherein the feedback delay loop processor comprises, for each frequency subband signal, a feedback loop and a diffuseness filter comprising a plurality of delay line taps, wherein the feedback loop comprises a delay element determining the loop delay for the frequency subband signal to acquire a feedback signal, and wherein the feedback loop comprises an adder for adding the frequency subband signal and the feedback signal, the adder being connected to the diffuseness filter, wherein the delay elements are different for the at least two different frequency subband signals, wherein the diffuseness filter or the delay line connected to the feedback loop and the combiner are configured as a sparse filter, wherein the sparse filter comprises a filter tap density, wherein a filter impulse response of the sparse filter approximates a predetermined energy envelope, wherein the sparse filter comprises a plurality of phase modification units, wherein each phase modification unit of the plurality of phase modification units is directly connected to an individual delay line tap of the plurality of delay line taps, and wherein each phase modification unit is configured to apply a multiplication-free phase operation to a corresponding signal output by the individual delay line tap, wherein the diffuseness filter or the delay line are complex-valued devices, and wherein each phase modification unit of the plurality of phase modification units comprises a first phase modification unit input for a real part of a respective delay line tap output signal or a second phase modification unit input for an imaginary part of the respective delay line tap output signal and a first phase modification unit output for the real part of a phase modified output signal or a second phase modification unit output for the imaginary part of the phase modified output signal, wherein the second phase modification unit input is directly connected to the first phase modification unit output and the first phase modification input is connected to an interconnected sign inverter, which is connected to the second phase modification unit output, wherein the real part of the phase modified output signal is based on the imaginary part of the respective delay line tap output signal and the imaginary part of the phase modified output signal is based on a sign-inverted real part of the respective delay line tap output signal; or wherein the first modification unit input is connected to an interconnected sign inverter, which is connected to the first phase modification unit output, and the second phase modification unit input is connected to an interconnected sign inverter, which is connected to the second phase modification unit output, wherein the real part of the phase modified output signal is based on a sign-inverted real part of the respective delay line tap output signal and the imaginary part of the phase modified output signal is based on a sign-inverted imaginary part of the respective delay line tap output signals; or wherein the first modification unit input is directly connected to the second phase modification unit output and the second phase modification input is connected to an interconnected sign inverter, which is connected to the first phase modification unit output, wherein the imaginary part of the phase modified output signal is based on the real part of the respective delay line tap output signal and the real part of the phase modified output signal is based on a sign-inverted imaginary part of the respective delay line tap output signal.

12. A non-transitory storage medium having stored thereon a computer program comprising a program code for performing, when the computer program is executed on a computer, a method for reverberating an audio signal, the method comprising:

delaying at least two different frequency subband signals representing the audio signal by different loop delays by using a feedback delay loop processor to acquire reverberated frequency subband signals, wherein the feedback delay loop processor comprises for a first frequency subband signal of the at least two frequency subband signals a first delay line comprising a first plurality of delay line taps providing signals delayed by different tap delays, a first feedback loop connected to the delay line and a first combiner for combining signals output by the plurality of delay line taps, and wherein the feedback delay loop processor comprises for a second different frequency subband signal of the at least two frequency subband signals a second delay line comprising a second plurality of delay line taps providing signals delayed by different tap delays, a second feedback loop connected to the second delay line and a second combiner for combining signals output by the second plurality of delay line taps, wherein the feedback delay loop processor comprises, for each frequency subband signal, a feedback loop and a diffuseness filter comprising a plurality of delay line taps, wherein the feedback loop comprises a delay element determining the loop delay for the frequency subband signal to acquire a feedback signal, and wherein the feedback loop comprises an adder for adding the frequency subband signal and the feedback signal, the adder being connected to the diffuseness filter, wherein the delay elements are different for the at least two different frequency subband signals, wherein the diffuseness filter or the delay line connected to the feedback loop and the combiner are configured as a sparse filter, wherein the sparse filter comprises a filter tap density, wherein a filter impulse response of the sparse filter approximates a predetermined energy envelope, wherein the sparse filter comprises a plurality of phase modification units, wherein each phase modification unit of the plurality of phase modification units is directly connected to an individual delay line tap of the plurality of delay line taps, and wherein each phase modification unit is configured to apply a multiplication-free phase operation to a corresponding signal output by the individual delay line tap, wherein the diffuseness filter or the delay line are complex-valued devices, and wherein each phase modification unit of the plurality of phase modification units comprises a first phase modification unit input for a real part of a respective delay line tap output signal or a second phase modification unit input for an imaginary part of the respective delay line tap output signal and a first phase modification unit output for the real part of a phase modified output signal or a second phase modification unit output for the imaginary part of the phase modified output signal, wherein the second phase modification unit input is directly connected to the first phase modification unit output and the first phase modification input is connected to an interconnected sign inverter, which is connected to the second phase modification unit output, wherein the real part of the phase modified output signal is based on the imaginary part of the respective delay line tap output signal and the imaginary part of the phase modified output signal is based on a sign-inverted real part of the respective delay line tap output signal; or wherein the first modification unit input is connected to an interconnected sign inverter, which is connected to the first phase modification unit output, and the second phase modification unit input is connected to an interconnected sign inverter, which is connected to the second phase modification unit output, wherein the real part of the phase modified output signal is based on a sign-inverted real part of the respective delay line tap output signal and the imaginary part of the phase modified output signal is based on a sign-inverted imaginary part of the respective delay line tap output signals; or wherein the first modification unit input is directly connected to the second phase modification unit output and the second phase modification input is connected to an interconnected sign inverter, which is connected to the first phase modification unit output, wherein the imaginary part of the phase modified output signal is based on the real part of the respective delay line tap output signal and the real part of the phase modified output signal is based on a sign-inverted imaginary part of the respective delay line tap output signal.

13. The reverberator of claim 1, further comprising:
a spectral converter for converting the audio signal into a spectral representation comprising the first frequency subband signal and the second frequency subband signal, wherein the spectral converter comprises at least one of a quadrature mirror filterbank, a modified discrete cosine transform and a Short Time Fourier Transform.

14. The method of claim 11, further comprising:
converting the audio signal into a spectral representation comprising the first frequency subband signal and the second frequency subband signal, wherein the converting comprises using at least one of a quadrature mirror filterbank, a modified discrete cosine transform and a Short Time Fourier Transform.

15. The non-transitory storage medium of claim 12, wherein the method further comprises converting the audio signal into a spectral representation comprising the first frequency subband signal and the second frequency subband signal, wherein the converting comprises using at least one of a quadrature mirror filterbank, a modified discrete cosine transform and a Short Time Fourier Transform.

\* \* \* \* \*